US005129004A

United States Patent [19]

Imai et al.

[11] Patent Number: 5,129,004

[45] Date of Patent: Jul. 7, 1992

[54] AUTOMOTIVE MULTI-SPEAKER AUDIO SYSTEM WITH DIFFERENT TIMING REPRODUCTION OF AUDIO SOUND

[75] Inventors: Hiroshi Imai, Yokosuka; Junichi Kasai; Hiroshi Tsuda, both of Yokohama, all of Japan

[73] Assignee: Nissan Motor Company, Limited, Yokohama, Japan

[21] Appl. No.: 434,503

[22] Filed: Nov. 13, 1989

Related U.S. Application Data

[63] Continuation of Ser. No. 157,153, Feb. 12, 1988, abandoned, which is a continuation of Ser. No. 796,974, Nov. 12, 1985, abandoned.

[30] Foreign Application Priority Data

| | | | |
|---|---|---|---|
| Nov. 12, 1984 | [JP] | Japan | 59-237946 |
| Feb. 28, 1985 | [JP] | Japan | 60-39437 |
| Mar. 5, 1985 | [JP] | Japan | 60-43259 |
| Mar. 25, 1985 | [JP] | Japan | 60-42691 |
| Apr. 12, 1985 | [JP] | Japan | 60-78166 |
| Apr. 20, 1985 | [JP] | Japan | 60-85222 |
| May 1, 1985 | [JP] | Japan | 60-94192 |

[51] Int. Cl.[5] .......... H04B 1/00

[52] U.S. Cl. .......... 381/86; 381/63

[58] Field of Search .......... 381/24, 63, 86

[56] References Cited

U.S. PATENT DOCUMENTS

| | | | |
|---|---|---|---|
| 3,027,964 | 4/1962 | Spragins, Jr. et al. | 181/176 |
| 3,062,923 | 11/1962 | Stolle | 381/17 |
| 3,303,904 | 2/1967 | Kelly | 181/176 |
| 4,039,755 | 8/1977 | Berkovitz | 381/63 |
| 4,146,111 | 3/1979 | Mae et al. | 181/155 |
| 4,164,631 | 8/1979 | Garner et al. | 181/176 |
| 4,181,820 | 1/1980 | Blesser et al. | 381/63 |
| 4,186,643 | 2/1980 | Nishibe et al. | 381/63 |
| 4,266,092 | 5/1981 | Barker, III | 381/24 |
| 4,325,454 | 4/1982 | Humphrey | 181/155 |
| 4,329,544 | 5/1982 | Yamada | 381/17 |
| 4,348,750 | 9/1982 | Schwind | 181/155 |
| 4,404,427 | 9/1983 | Blackmer | 381/17 |
| 4,424,881 | 1/1984 | Hattori | 181/155 |
| 4,472,993 | 9/1984 | Futamase et al. | 381/63 |
| 4,503,553 | 3/1985 | Davis | 381/24 |
| 4,558,460 | 12/1985 | Tanaka et al. | 381/86 |
| 4,584,701 | 4/1986 | Nakama et al. | 381/63 |
| 4,594,729 | 6/1986 | Weingartner | 381/86 |
| 4,611,300 | 9/1986 | Taylor, Jr. et al. | 381/63 |
| 4,625,829 | 12/1986 | Sirois | 181/175 |
| 4,648,117 | 3/1987 | Kunungi et al. | 381/86 |
| 4,691,362 | 9/1987 | Eberbach | 381/24 |
| 4,694,497 | 9/1987 | Kasai et al. | 381/63 |
| 4,720,867 | 1/1988 | Imai et al. | 381/86 |

FOREIGN PATENT DOCUMENTS

| | | |
|---|---|---|
| 58-194095 | 11/1983 | Japan . |
| 59-67800 | 4/1984 | Japan . |
| 59-149800 | 10/1984 | Japan . |

OTHER PUBLICATIONS

Chamberlin, Musical Applications of Microprocessors, 1980, pp. 447–451.

*Primary Examiner*—Forester W. Isen
*Attorney, Agent, or Firm*—Foley & Lardner

[57] ABSTRACT

An automotive audio system separates audio signals from an audio signal source into first and second components. The first component of the audio signal is sent directly to a first main amplifier and reproduced through a main speaker or speakers. On the other hand, the second component of the audio signal is sent to a second main amplifier after a predetermined delay time determined by a delay circuit. The delayed second component of the audio signal is reproduced through a auxiliary speaker or speakers after the predetermined delay time. The first and auxiliary speakers are distinct and preferably located at different points in the vehicle compartment. As a result, the directly reproduced first component and the delayed second component are reproduced through different audio sound sources. This affords the listener higher-quality audio sound and better ambience. If necessary, an echo signal generator may be added to the second component reproduction system to provide an echo effect. In this case, since the second component is reproduced by the second speaker or speakers which are different from the main speaker or speakers which reproduce the direct first component, the echo effect can be optimized for good ambience.

5 Claims, 21 Drawing Sheets

AUTOMOTIVE MULTI-SPEAKER AUDIO SYSTEM WITH DIFFERENT TIMING REPRODUCTION OF AUDIO SOUND

This application is a continuation of application Ser. No. 07/157,153, filed Feb. 12, 1988, now abandoned, which is a continuation of application Ser. No. 06/796,974, filed Nov. 12, 1985, now abandoned.

BACKGROUND OF THE INVENTION

The present invention relates generally to an automotive audio system with a plurality of speakers installed within a vehicular compartment. More specifically, the invention relates to an automotive multi-speaker audio system which can generate good audio sound for listeners in any vehicular seat within the compartment.

In modern automotive vehicles, built-in vehicle-mountable audio systems, i.e. radios, magnetic tape players, compact disk player and so forth have become very popular. In addition, these automotive audio systems produce higher and higher quality audio sound. Various relatively high-quality, expensive systems have been developed and put on the market.

So-called ambience control systems which adjust the volumes and phases among the speakers in multi-speaker systems have recently become an additional feature. Conventional ambience control systems simply adjust the reproduction volume level at each speaker in order to control interference among acoustical vibrations in the vehicle compartment and so shift the acoustical vibration center to just above a single listener or distributing the acoustical vibration centers among multiple listeners.

Such conventional ambience control systems are commercially successful, as they provide a reasonable or at least acceptable level of audio sound. However, since such conventional ambience control systems merely control the reproduction volume, the quality of audio sound cannot be improved at all. In another approach, echo systems have been introduced in automotive audio systems to provide better quality of sound, i.e. a better ambience. In typical automotive audio systems with such echo systems, the audio signals from an audio signal source, such as a radio, a magnetic tape recorder or a compact disk player, are separated into two components. One of the components is then sent to a mixer and the other is processed in an echo signal generator and then sent to the mixer. The mixer mixes the direct audio signal with the echo signal from the echo signal generator and send the mixed signal to a main amplifier. Therefore, the echo signal produced by the echo signal generator is reproduced through a common main amplifier and a common speaker systems with the direct audio sound. This system spoils the effect of the echo signal. In particular, in the automotive audio systems, since the compartment is very narrow and thus speaker or speakers are necessarily located near the listeners, echo systems in automotive audio systems have not been at all effective. Therefore, the need for higher quality audio sound and better ambience has not yet been satisfied.

SUMMARY OF THE INVENTION

Therefore, it is a principle object of the invention to provide an automotive audio system which satisfies the requirement for higher quality audio sound and better ambience.

Another and more specific object of the invention is to provide an automotive audio system which achieves better ambience by differentiating the reproduction timing of audio signals so as to produce a deeper and wider feeling in the reproduced audio sound.

A further object of the present invention is to provide an automotive audio system which can optimize the effect of an echo system on better audio sound quality and ambience.

In order to accomplish the aforementioned and other objects, an automotive audio system, according to the present invention, separates audio signals from an audio signal source into first and second components. The first component of the audio signal is sent directly to a first main amplifier and reproduced through a main speaker or speakers. On the other hand, the second component of the audio signal is sent to a second main amplifier after a predetermined delay time mediated by a delay circuit. The delayed second component of the audio signal is reproduced through a auxiliary speaker or speakers after the predetermined delay time.

The first and auxiliary speakers are distinct and preferably located at different points in the vehicle compartment. As a result, the directly reproduced first component and the delayed second component are reproduced through different audio sound sources. This affords the listener higher-quality audio sound and better ambience.

If necessary, an echo signal generator may be added to the second component reproduction system to provide an echo effect. In this case, since the second component is reproduced by the second speaker or speakers which are different from the main speaker or speakers which reproduce the direct first component, the echo effect can be optimized for good ambience.

According to one aspect of the invention, an automotive audio system comprises an audio signal source adapted to generate audio signals for reproduction, a first speaker adapted to generate a first audio sound by reproducing the audio signals from the audio signal source, first means for receiving and processing the audio signals from the audio signal source so as to delay the audio signals and for outputting a processed signal, and a second speaker independent of the first speaker and adapted to generate a second audio sound by reproducing the processed signal.

DESCRIPTION OF THE PREFERRED EMBODIMENT

Figure 1:
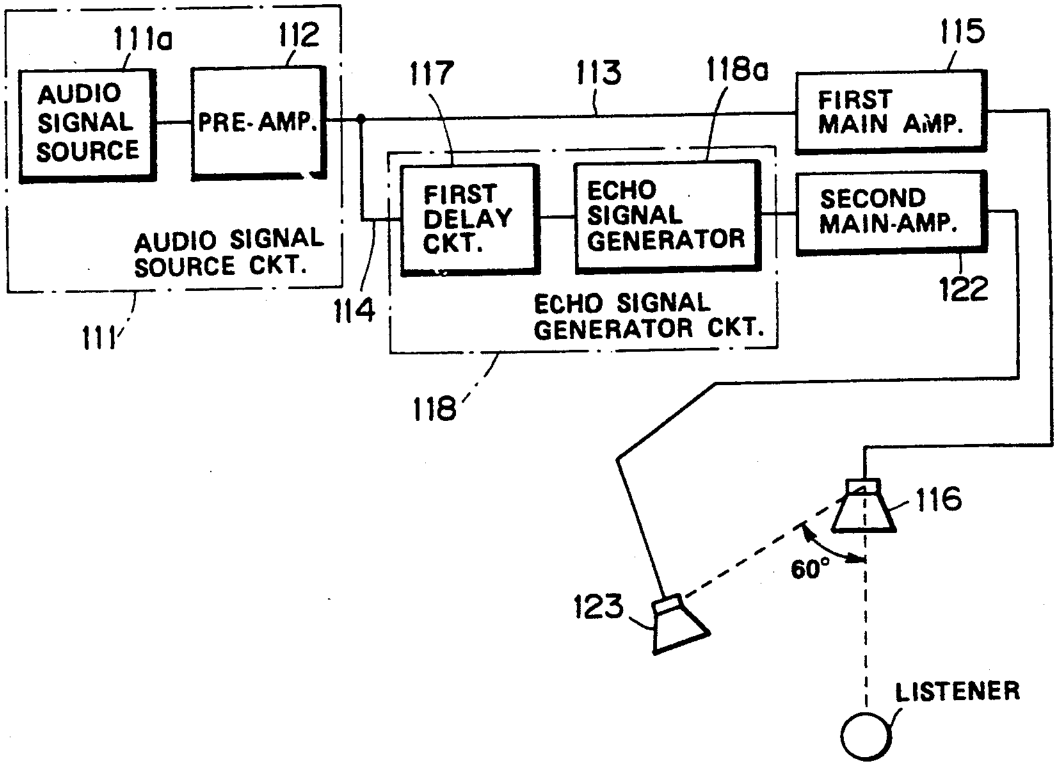
FIG. 1 is a schematic block diagram of the first embodiment of an automotive audio system according to the present invention.
Figure 2:
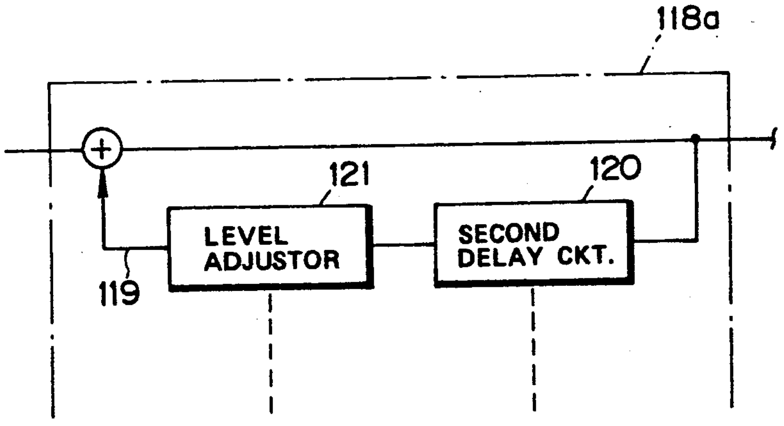
FIG. 2 is a block diagram of an echo signal generator circuit in the automotive audio system of FIG. 1.
Figure 3:
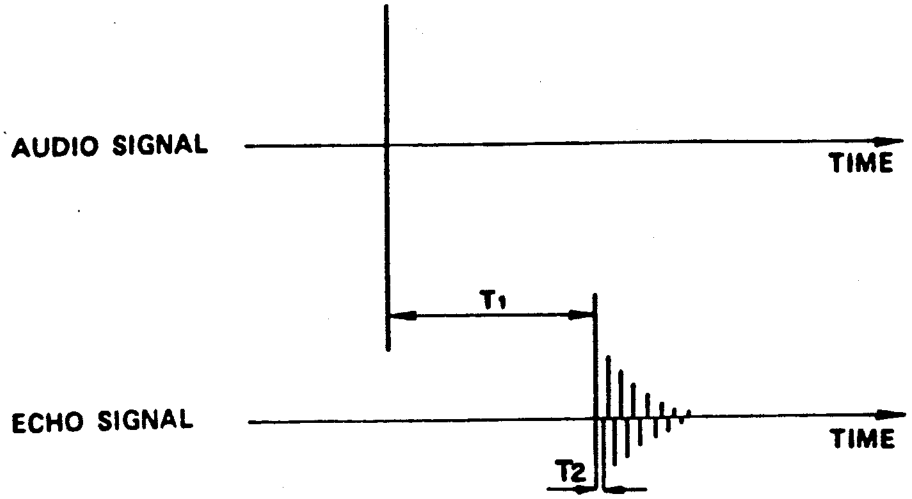
FIG. 3 is a timing chart of some signals in the automotive audio system of FIG. 1.

Referring now to the drawings, particularly to FIGS. 1 to 3, the first embodiment of an automotive audio system, according to the present invention, generally comprises an audio signal source 111, such as a radio tuner, a tape player, a compact disk player and so forth, a pre-amplifier 112, a first circuit 113 including a first main-amplifier 115 and a second circuit 114 including a first delay circuit 117, an echo signal generator circuit 118 and a second main-amplifier 122, a first speaker 116 and a auxiliary speaker 123. The first circuit 113 receives the audio signal S1 directly from the pre-amplifier 112. The first main-amplifier 115 in the first circuit 113 amplifies the audio signal S1 and feeds the amplified audio signal to the main speaker 116 for reproduction. The second circuit 114 also receives the audio signal S1 from the pre-amplifier 112. The second circuit 114 includes the first delay circuit which imposes a delay time T in the range from 0.4 ms to 50 ms inclusive. The delay circuit 117 comprises a charge transfer device, such as a BBD, a CCD or the like.

As is well known, when identical sounds separated by a short lag time reach a listener from different directions, the direction of the sound source is recognized to be the direction of the earlier sound. This effect applies to lags of approximately 0.4 ms to 40 ms. In the case of shorter lags the sound source appears to be intermediate the earlier and later sounds. On the other hand, in the case of longer lags, the sounds are heard separately and distinctly. Also, it is well known that the apparent distance from the sound source is significantly influenced by echo. In particular, echo causes the sound source to appear to be farther than the actual distance. Therefore, by inducing an appropriate degree of lag and echo in the reproduced audio sound, the quality of the reproduced sound and the audio ambience can be improved.

FIG. 2 shows the echo signal generator 118*a* in the audio system of FIG. 1 in greater detail. The echo signal generator 118*a* comprises a feedback circuit 119 which includes a second delay circuit 120 and a level adjustor circuit 121. The second delay circuit 120 comprises a charge transfer device, such as a BBD, a CCD or so forth and has a variable delay time. The adjustment resolution of the second delay circuit 120 is preferably shorter than 1 ms.

The output of the echo signal generator circuit 118 is sent to an auxiliary speaker 123 through a second main amplifier 122. As can be seen in FIG. 1, the second speaker 123 is arranged so as to lie on a line subtending an angle of about 45° to 90° at the main speaker 116 with respect to the axis extending through the main speaker 116 and the listener.

In this arrangement, the audio signal from the audio signal source 111 is transmitted to the first and auxiliary speakers 116 and 123 via the first and second circuits 113 and 114. The first audio signal component S1 transmitted through the first circuit 113 is directly reproduced by the main speaker 116 without any delay. On the other hand, the second audio signal component S2 transmitted through the second circuit 114 is delayed by a time $T_1$ by the first delay circuit 117, as shown in FIG. 3. After the delay time $T_1$, the second audio signal component S2 is sent to the echo signal generator 118*a*. In the echo signal generator 118*a*, a further delay $T_2$ is induced by the second delay circuit 120. The level adjustor circuit 121 selectively attenuates the second audio signal. By repeatedly feeding back the second audio component with the delay time $T_2$, a desired echo signal can be obtained. The echo signal is sent to the auxiliary speaker 123 via the second main amplifier 122.

As set forth above, the delay time in the second circuit 114 is set to be within the range of 0.4 msec. to 50 msec so that the listener will hear audio sound coming from a source in the direction of the main speaker 116. In addition, due to the effect of echo sound reproduced through the auxiliary speaker 123, the apparent distance to the main speaker 116 is greater than the actual distance. Furthermore, by arranging the second speaker at the angle with respect to the axis extending through the main speaker and the listener, the echo sound may be subliminally perceived as an echo from a relatively distance wall. Therefore, as will be appreciated, the ambience of the sound reproduced by the shown embodiment can be significantly improved.

It should be appreciated that it would be advantageous to allow manual adjustment of the level adjustor circuit 121 and the second delay circuit 120, in order to allow manual adjustment of the characteristics of the echo sound. It should also be appreciated that although the foregoing disclosure concerns a monaural audio system, the shown embodiment is, of course, applicable to stereo audio systems.

Figure 4:
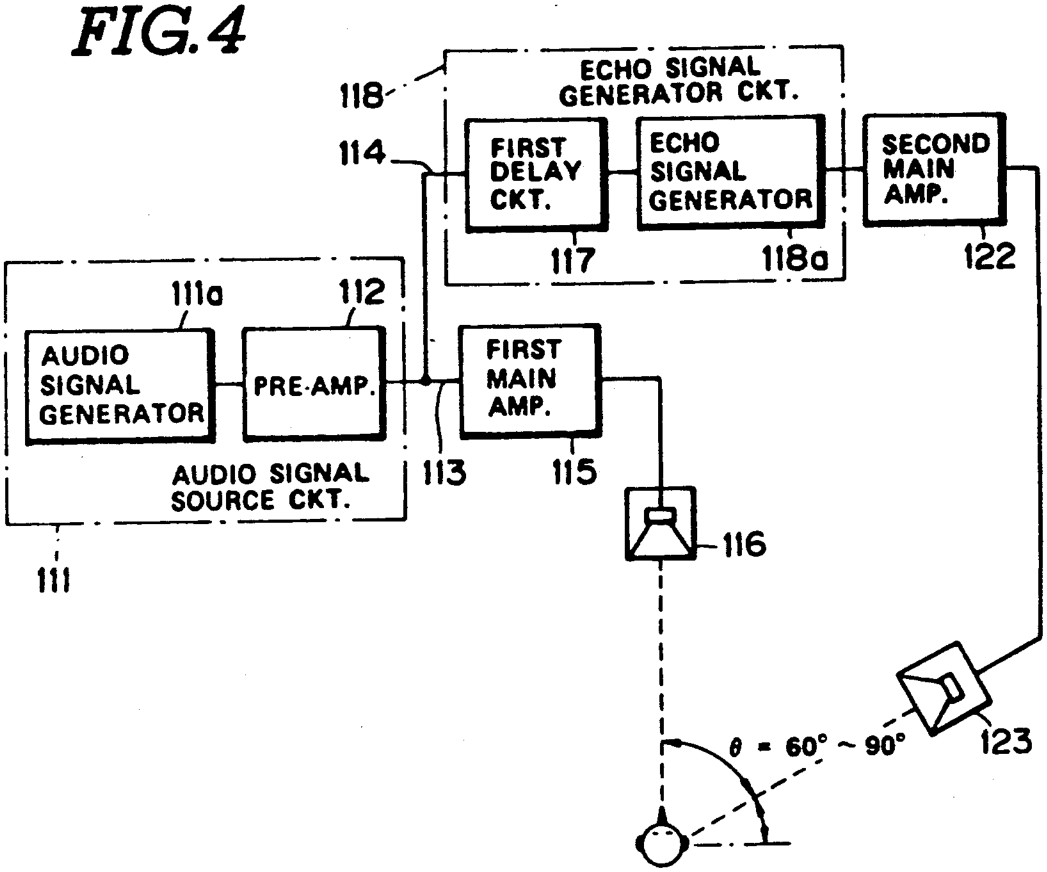
FIG. 4 is a diagram of the preferred speaker arrangement of the first embodiment of the automotive audio system of FIG. 1.
Figure 5:
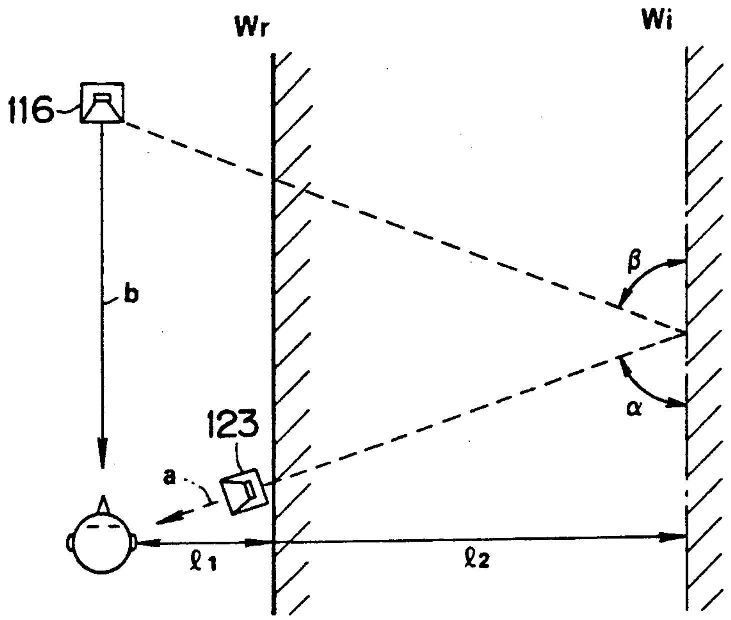
FIG. 5 is a diagram of use in explaining the principle of the preferred arrangement of the speakers.
Figure 6:
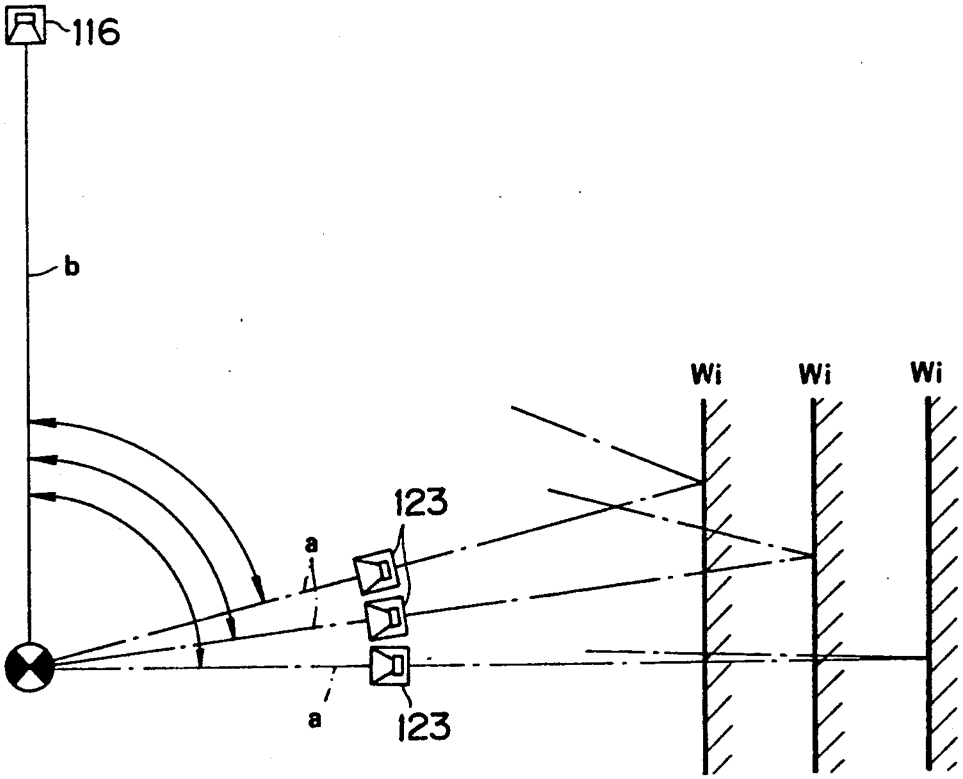
FIG. 6 is a diagram of a modified speaker arrangement and of the function thereof.

FIGS. 4 and 5 show a modified speaker arrangement in the foregoing first embodiment of the automotive audio system according to the invention. In the modified arrangement of FIG. 4, the auxiliary speaker 123 is so arranged as to have an acoustical axis oblique to the acoustical axis of the main speaker 116 in a range of 60° to 90°. As shown in FIG. 5, this speaker arrangement is advantageously cooperative with the delay of echo sound reproduction by the auxiliary speaker 123. As can be seen in FIG. 5, the angle and delay timing of the auxiliary speaker 123 are selected to simulate reflection at an angle of incidence $\beta$ from an imaginary flat wall Wi. In other words, the auxiliary speaker 123 lies on the path, shown by the broken line a in FIG. 5, of sound from the main speaker 116 reflecting off the imaginary wall Wi to the listener. As will be appreciated, the simulated reflection from the imaginary wall Wi will make the listener feel that he is farther from the wall than he really is. This imaginary additional distance λ2 above the actual distance λ1 to the actual wall Wr from the listener is determined by the angle $\beta$, i.e. 60° to 90° relative to the acoustical axis of the main speaker 116. Specifically, the distance λ2 may be increased by increasing the angle of the auxiliary speaker 123 relative to the main speaker 116, as shown in FIG. 6.

Figure 7:
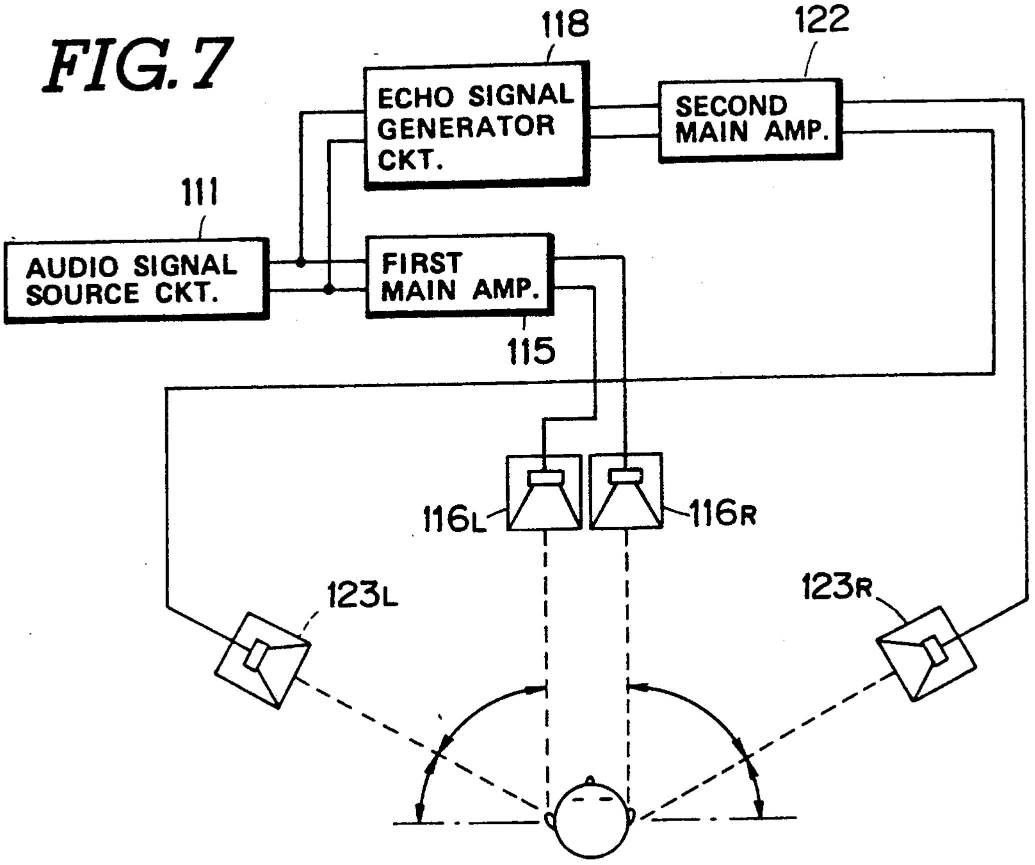
FIG. 7 is a diagram of another preferred speaker arrangement for the first embodiment of the automotive audio system.

FIG. 7 shows another modification to the first embodiment set forth above. In this modification, the first embodiment of the automotive audio system is applied to a stereo system having two separate channels, i.e. left and right channels. This system includes a left-channel main speaker 116L, a right-channel main speaker 116R, a left-channel auxiliary speaker 123L and a right-channel auxiliary speaker 123R. In addition, the monaural first and second main amplifiers 115 and 122 in the first and second circuits 113 and 114 are replaced by stereo amplifiers.

As in the embodiment of FIG. 4, the acoustical axes a of the left- and right-channel auxiliary speakers 123L and 123R are respectively angled with respect to the corresponding acoustical axes b of the left- and right-channel main speakers 116L and 116R. Both of the left- and right-channel auxiliary speakers 123L and 123R serve to reproduce delayed echo sound as in the foregoing first embodiment.

As will be appreciated, this arrangement affords the listener good audio ambience as in the foregoing first embodiments.

Figure 8:
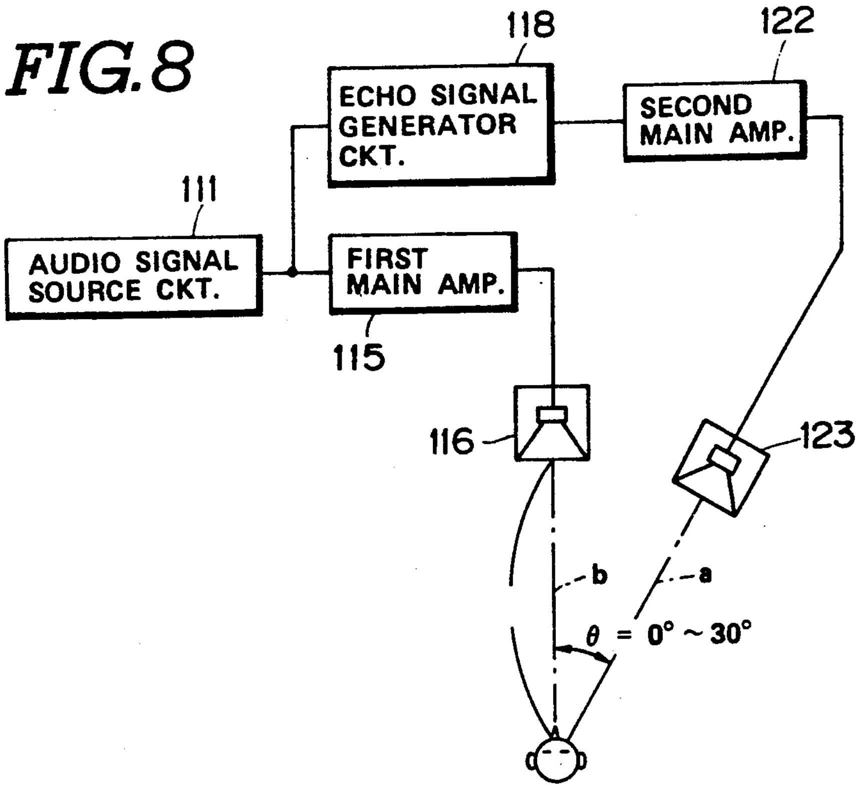
FIG. 8 is a diagram of a yet another preferred speaker arrangement for the first embodiment of the automotive audio system.

FIG. 8 shows an alternative modification to the embodiment shown in FIG. 4. As will be appreciated from the description given hereabove, the modification of FIG. 4 is designed to provide an apparent transverse expansion by setting up an imaginary reflecting point for acoustical vibrations to one side of the listener. This modification is designed to provide an apparent axial expansion by means of a smaller angle $\theta$ between the acoustical axis a of the auxiliary speaker 123 and the acoustical axis b of the main speaker 116, than in FIG. 4. In the preferred arrangement, the angle $\theta$ is selected to be within the range of 0° to 30°.

Figure 9:
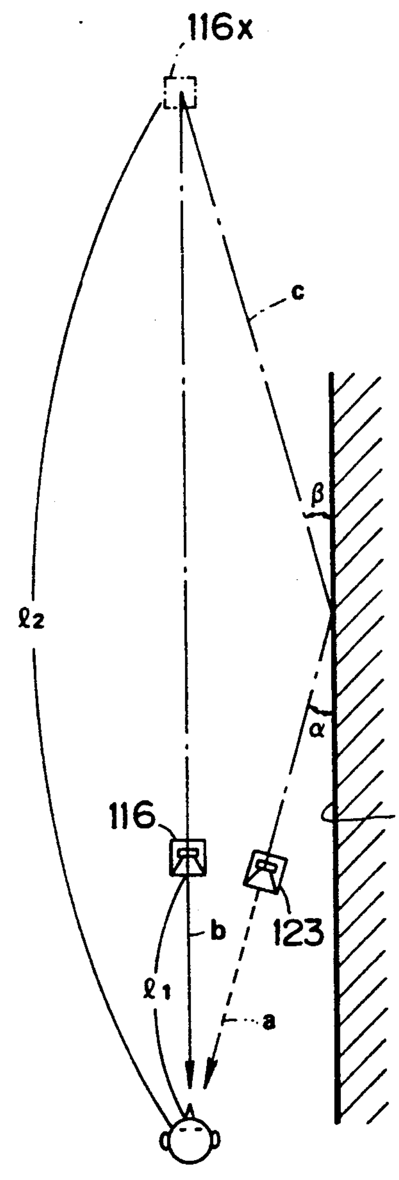
FIGS. 9 and 10 are diagrams of the principles of the preferred speaker arrangement of FIG. 8.

As shown in FIG. 9, in this case, the delayed echo sound from the auxiliary speaker 123 appears to be transmitted from an imaginary audio source 116X located on the axial extension of the acoustical axis b of the main speaker 116 at a distance λ2 from the listener, and then reflected by the imaginary side wall Wi at the reflection angle $\alpha$ corresponding to angle of incidence $\beta$. As will be appreciated, this distance λ2 is substantially longer than the actual distance λ1 to the main speaker 116.

Therefore, as intended, apparent axial expansion of the listening space can be obtained within the limited space of the vehicular cabin. This clearly provides a better listening ambience.

Figure 10:
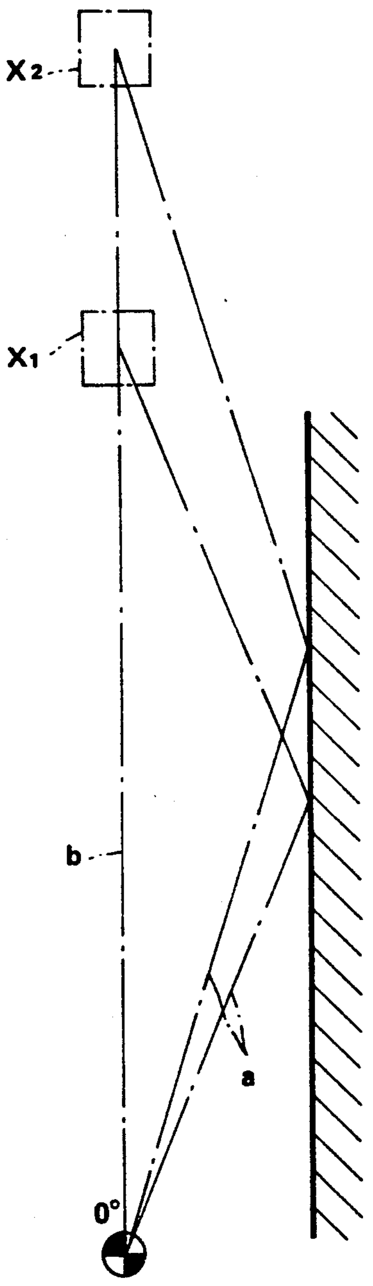

As will be appreciated from FIG. 10, the position of the imaginary audio sound source 116X can be adjusted by varying the angle $\theta$ between the acoustical axis a of the auxiliary speaker 123 and the acoustical axis b of the main speaker 116. Specifically, by reducing the angle $\theta$, the distance λ2 expands.

It should be noted that it is essential to set the angle $\theta$ to within the range of 60° to 90° in order to obtain apparent transverse expansion of the listening space and, conversely to set the angle $\theta$ to within the range of 0° to 30° to achieve apparent axial expansion of the listening space.

Figure 11:
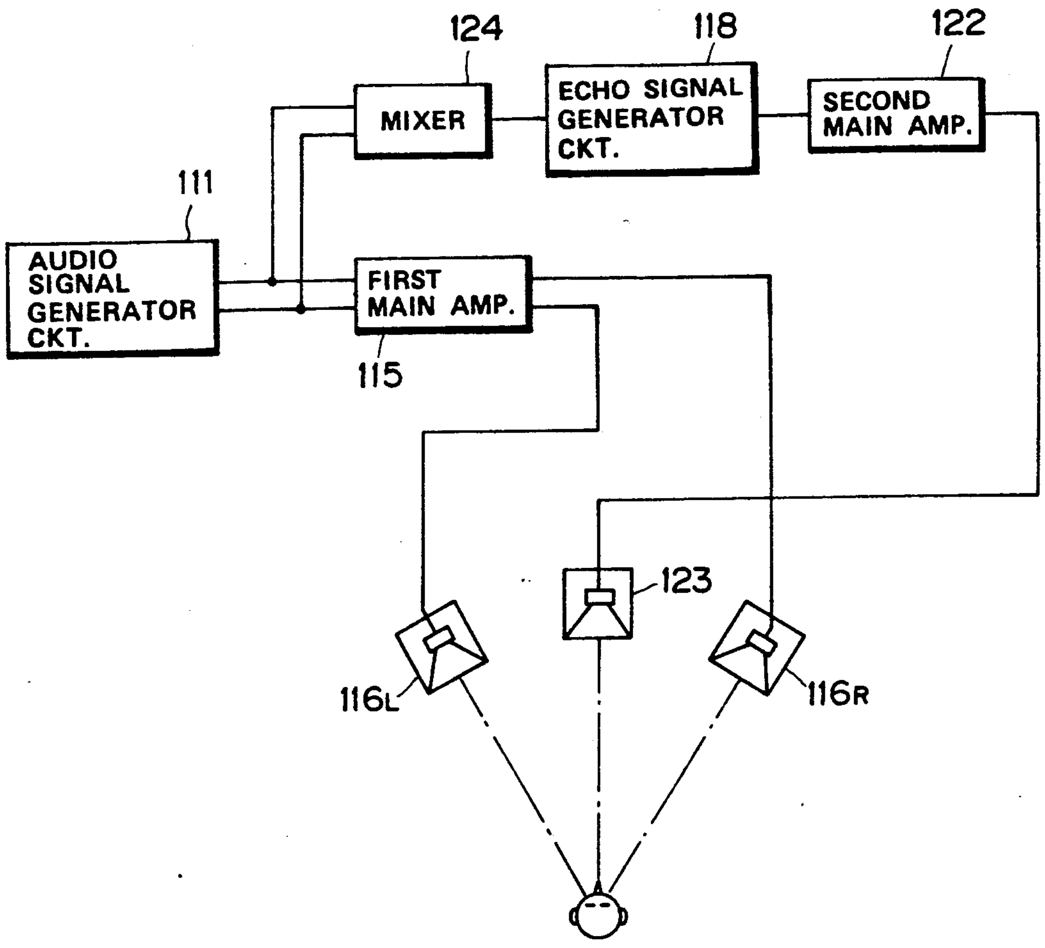
FIG. 11 is a diagram of a modification of the speaker arrangement of FIG. 8.

FIG. 11 shows a further modification to the embodiment of FIG. 8. This modification is directed toward application of the speaker arrangement of FIG. 8 to stereo audio systems. In this case, the audio system includes a left-channel main speaker 116L and a right-channel main speaker 116R. A single auxiliary speaker 123 is also provided between the left- and right-channel main speakers 116L and 116R. The acoustical axes b of the left- and right-channel main speakers 116L and 116R are oblique to the acoustical axis a of the auxiliary speaker 123 but within the range of 0° to 30°. In this case, the auxiliary speaker 123 is located directly in front of the listener.

For stereo reproduction, a stereo audio signal source such as a CD player, a tape player, a radio tuner or the like produces left- and right-channel audio signals. In order to reproduce the left- and right-channel audio signals separately through the left-and right-channel main speakers 116L and 116R, the main amplifier 115 is a stereo main amplifier. On the other hand, in order to use the auxiliary speaker 123 for both channels, a mixer 124 is provided to mix the left- and right-channel audio signals and send the composite signal to the echo signal generator circuit 118.

This modification produces apparent axial expansion equivalent to that of the embodiment of FIG. 8. Therefore, this embodiment also improves the ambience of the automotive stereo audio system.

Figure 12:
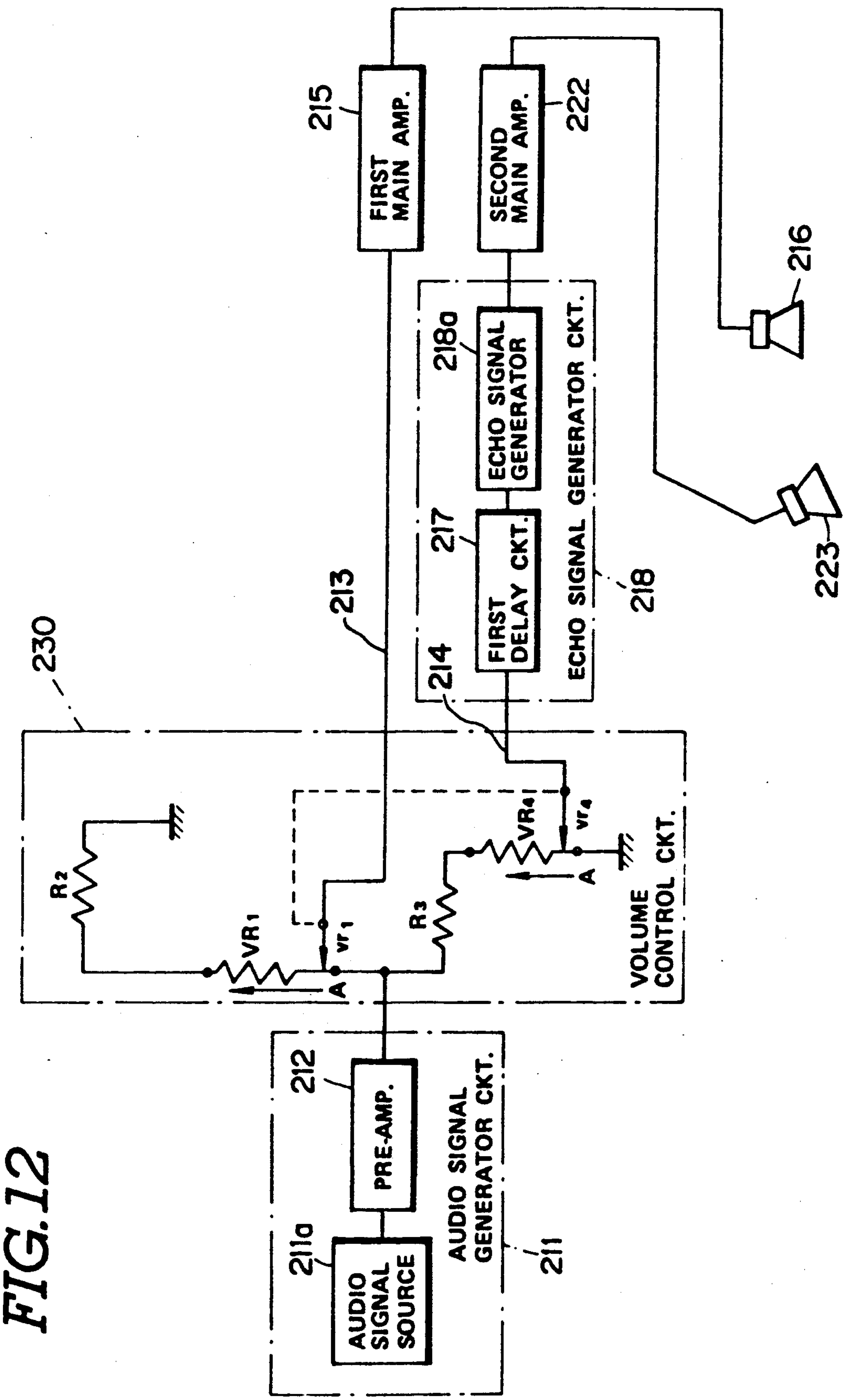
FIG. 12 is a schematic block diagram of the second embodiment of an automotive audio system according to the present invention.

FIG. 12 shows the second embodiment of the automotive audio system according to the invention. In this embodiment, a volume controller 230 is inserted in the audio system circuit between a pre-amplifier 212 and a first delay circuit 217 and a first main amplifier 215.

The volume controller 230 is designed to control the volume of the reproduced audio sounds through the main and auxiliary speakers 216 and 223 independently so that the combined volume of the audio sound output remains approximately constant.

As in the foregoing first embodiment, the shown embodiment of the audio system has an audio signal source 211, such as a CD player, a tape player, a radio tuner or the like. Also, the system has a first circuit 213 including the first main amplifier 215 and the main speaker 216, and a second circuit 214 including a first delay circuit 217, an echo signal generator 218*a*, a second main amplifier 222 and the auxiliary speaker 223. The operation of the aforementioned circuit elements in the first and second circuits 213 and 214 are substantially the same as disclosed with respect to the first embodiment.

The volume controller 230 comprises a variable resistor $VR_1$ and a resistor $R_2$ connected in series to ground, and a resistor $R_3$ and a variable resistor $VR_4$ connected in series to ground. The variable resistors $VR_1$ and $VR_4$ have variable contacts $vr_1$ and $vr_4$ for adjusting the resistances of the corresponding variable resistors. The variable contacts $vr_1$ and $vr_4$ cooperate when varying the resistance of the variable resistors $VR_1$ and $VR_4$.

The variable contact $vr_1$ is connected electrically for output to the first main amplifier 215 in the first circuit 213. On the other hand, the variable contact $vr_4$ is connected to the first delay circuit 217 in the second circuit 214.

In the condition shown in FIG. 12, the resistance of the variable resistor $VR_4$ is set to its maximum. Thus, no output from the variable resistor $VR_4$ is transmitted to the first main amplifier 215. On the other hand, the resistance of the variable resistor $VR_1$ is minimized. Therefore, the output level of the variable resistor $VR_1$ to the first main amplifier 215 is maximized. As a result, audio sound is reproduced only by the main speaker 216. This resistance arrangement would be an advantageous addition to automotive audio systems for ensuring clarity by suppressing echo sound, for example during FM announcements.

The resistances of the variable resistors $VR_1$ and $VR_4$ are adjusted by shifting the variable contacts $vr_1$ and $vr_4$ along the arrow A, whereby the resistance of the variable resistor $VR_4$ decreases. For a given shift of the variable contact $vr_1$ from the position of FIG. 12, the resistance of the variable resistor $VR_1$ remains at its minimum value. However, due to the drop in the resistance of the variable resistor $VR_4$, echo sound starts to be reproduced faintly through the auxiliary speaker 223. At the same time, since the resistance of the variable resistor $VR_1$ is still minimized, the volume of the audio sound reproduced through the main speaker 216 remains at its maximum level. By shifting the variable contacts $vr_1$ and $vr_4$ farther along the arrow A, the resistance of the variable resistor $VR_4$ is further reduced, so that the echo sound from the auxiliary speaker 223 becomes louder and correspondingly, the resistance of the variable resistor $VR_1$ increases so that the audio sound from the main speaker 216 grows softer. Since the resistances of the variable resistors $VR_1$ and $VR_4$ are approximately inversely proportional to each other, the drop in the volume of the main speaker 216 is offset by the increase in the volume of the auxiliary speaker 223. As a result, the overall or total reproduction level can be held approximately constant.

In the preferred arrangement, the variable contacts $vr_1$ and $vr_4$ are manually operable by the listener to allow selection of the echo sound level and audio sound level according to taste.

When the variable contacts $vr_1$ and $vr_4$ are shifted further so that the resistance of the variable resistor $VR_1$ is maximized, the reproduction level of the main speaker 216 is minimized but can continue to output sound. This prevents the audio system from reproducing only the echo sound.

Figure 13:
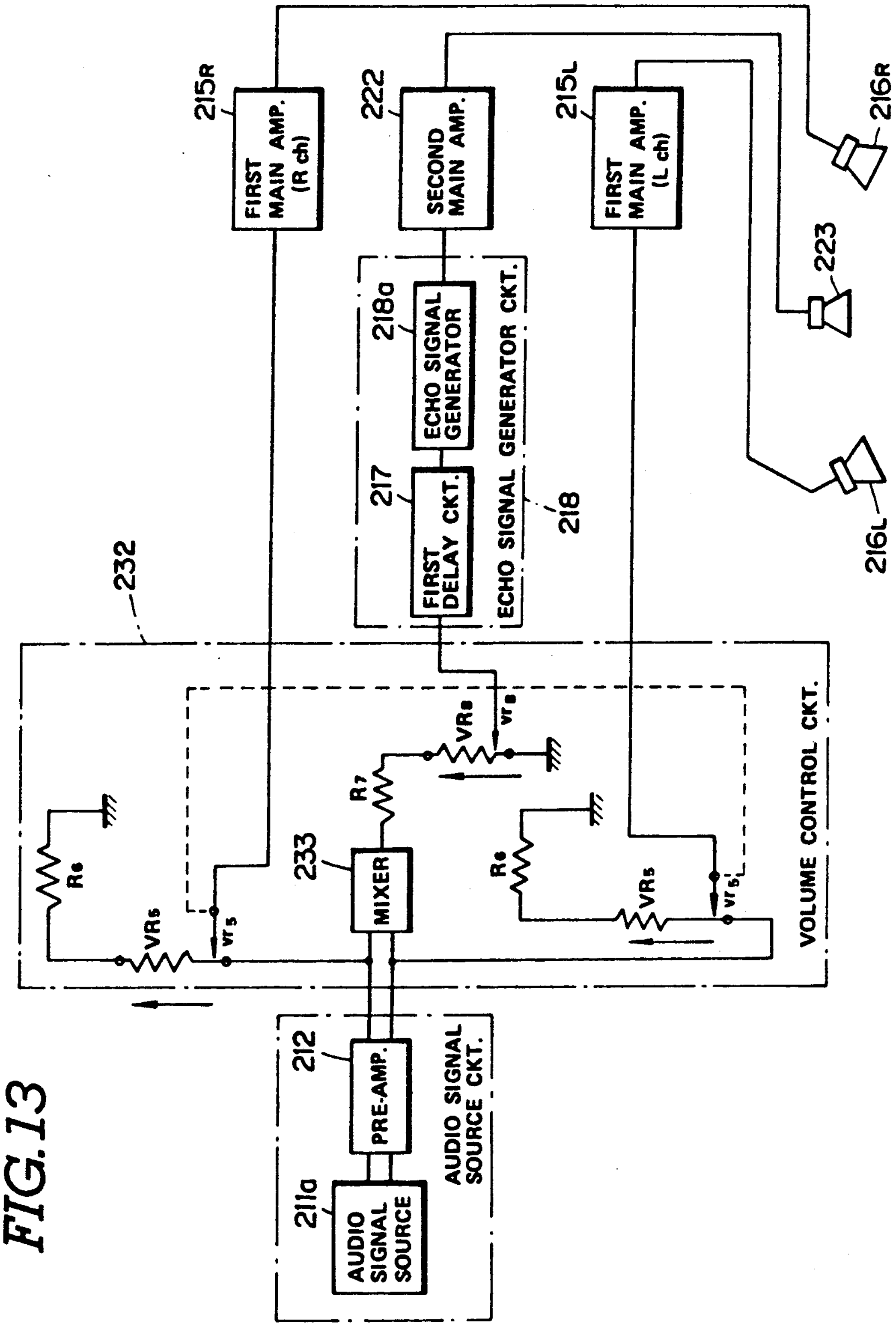
FIG. 13 shows a modification to the second embodiment of the automotive audio system of FIG. 12.

FIG. 13 shows a modification to the foregoing second embodiment of the automotive audio system according to the present invention. In this modification, the volume controller equivalent to the above is applied to a stereo audio system which has a left channel and a right channel. In order to reproduce left and right channels of audio sound, there is provided a left-channel main speaker 216L and a right-channel main speaker 216R. In the shown arrangement, the auxiliary speaker 223 is used in common for both left- and right-channel echo sounds. The left-and right-channel main speakers 216L and 216R are each connected to corresponding first amplifiers 215L and 215R.

The volume controller 232 comprises in part two identical circuits, each consisting of a variable resistor $VR_5$, a resistor $R_6$, and a movable contact $vr_5$. The variable contacts $vr_5$ are connected to the left- and right-channel main amplifiers 215L and 215R. Another volume-control circuit consists of a mixer 233, a resistor $R_7$, a variable resistor $VR_8$, and a movable contact $vr_8$. The variable contact $vr_8$ of the variable resistor $VR_8$ is connected to the first delay circuit 217.

The variable contacts $vr_5$ move together and work substantially the same as the variable contact $vr_1$ of the variable resistor $VR_1$ in the foregoing embodiment. Similarly, the variable contact $vr_8$ moves with the variable contacts $vr_5$ in substantially the same inverse manner as set out with respect to the variable contact $vr_4$ of the variable resistor $VR_4$ in the foregoing embodiment.

As will be appreciated herefrom, the shown modification to the second embodiment has essentially the same effect as can be obtained by the foregoing second embodiment. This proves that the second embodiment is applicable to both monaural and stereo audio systems.

Figure 14:
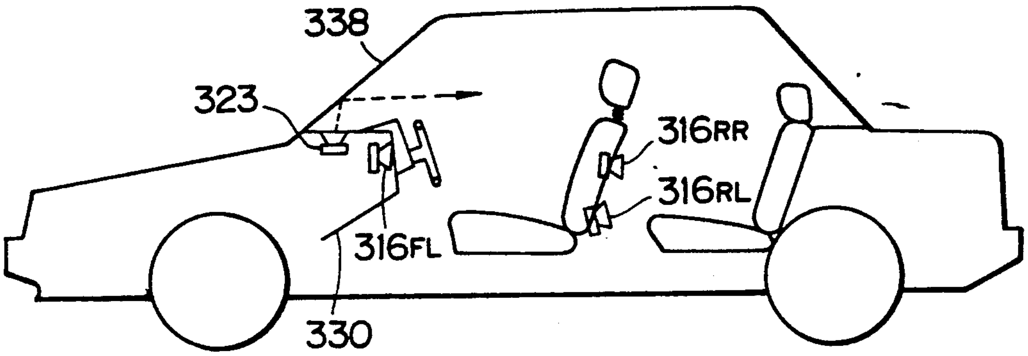
FIG. 14 is an illustration of an automotive vehicle in which the third embodiment of an automotive audio system with a multi-speaker system according to the present invention is installed.
Figure 15:
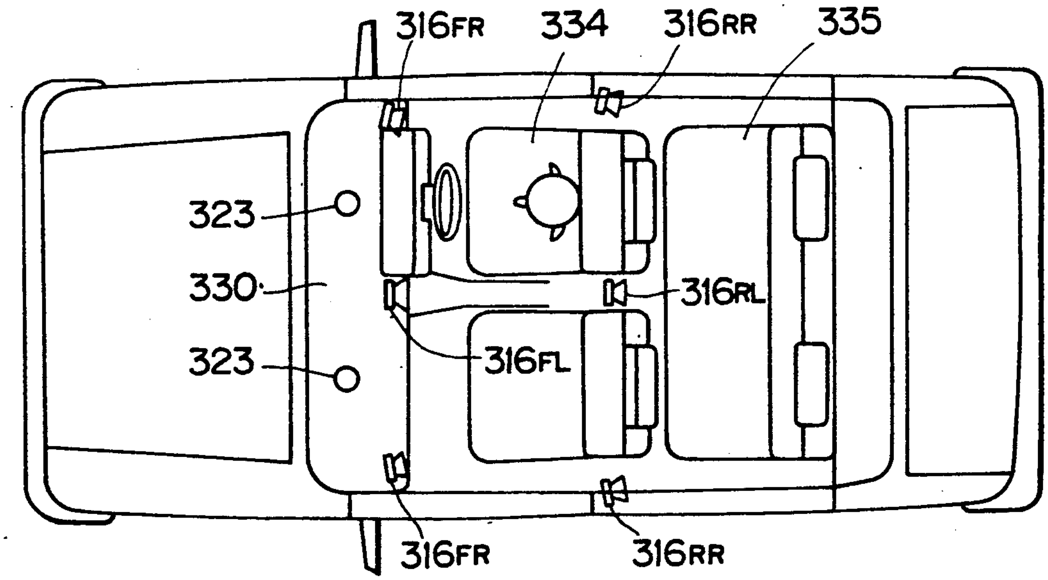
FIG. 15 is a plan view of the vehicle showing the speaker arrangement in the third embodiment of the automotive audio system.
Figure 16:
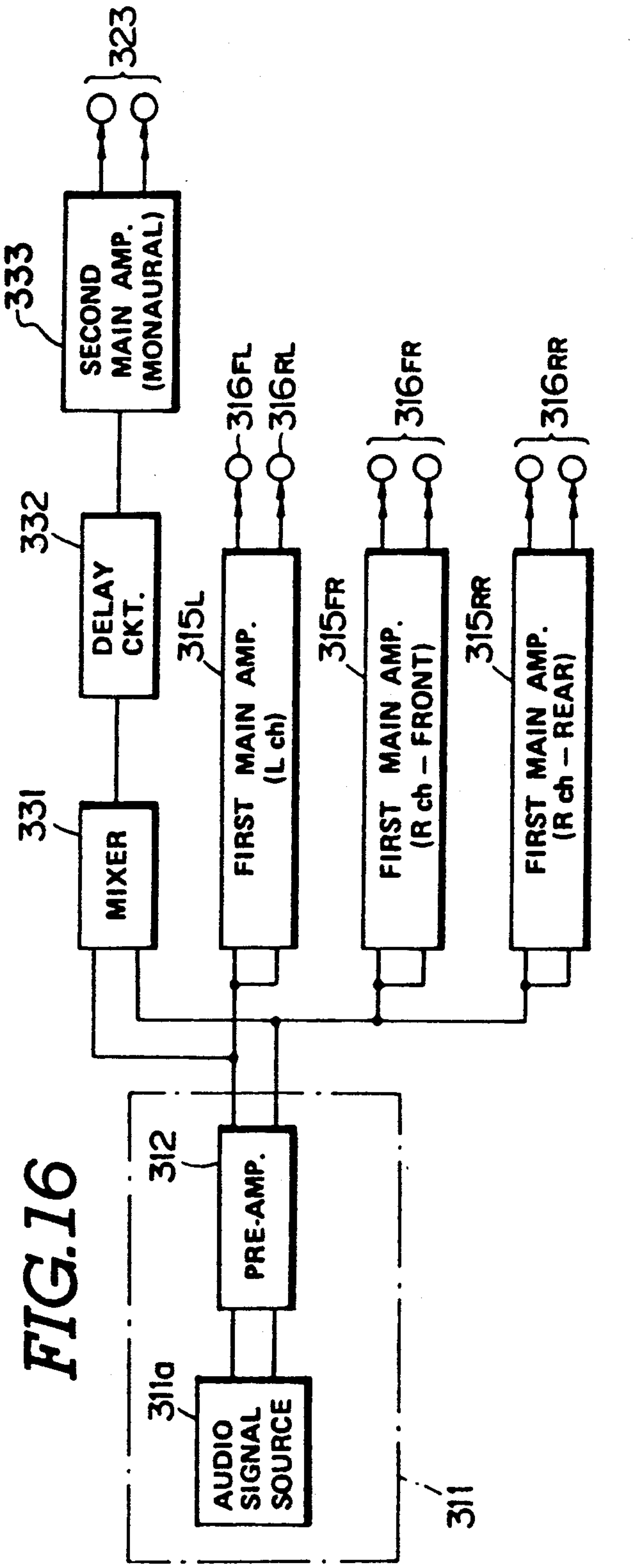
FIG. 16 is a schematic block diagram of the third embodiment of the automotive audio system according to the invention.

FIGS. 14 to 16 show the third embodiment of the automotive audio system according to the invention. This embodiment concerns diffusion or distribution of the echo sound produced by one or more auxiliary speakers 323.

The shown embodiment employs six main speakers 316, i.e. a left-channel front main speaker 316FL, a left-channel rear main speaker 316RL, a pair of right-channel front main speakers 316FR and a pair of right-channel rear main speakers 316RR. The left-channel front and rear main speakers 316FL and 316RL are installed along the central axis of the vehicle compartment. On the other hand, the right-channel front and rear speakers 316FR and 316RR are arranged on opposite transverse sides of the vehicle compartment. A pair of auxiliary speakers 323 are installed in the instrument panel 330 facing upward.

As shown in FIG. 16, the main speakers 316 are connected to the audio signal source 311*a* through a pre-amplifier 312 and a corresponding main amplifier 315FL, 315RL, 315FR and 315RR. On the other hand, the auxiliary speakers 323 are connected to the audio signal source through the pre-amplifier 312, a mixer 331, a delay circuit 332 and a monaural main amplifier 333. Similarly to the foregoing embodiments, the delay circuit 332 imposes a 0.4 msec. to 50 msec. delay in the reproduced monaural sound.

Returning to FIGS. 14 and 15, as shown in FIG. 15, the left-channel front and rear main speakers 316FL and 316RL are directed with their acoustical axes substantially along the central axis of the vehicle compartment. On the other hand, the right-channel front and rear speakers 316FR and 316RR installed on the left side of the vehicle compartment are respectively directed toward the left-front and left-rear seats 334 and 335. Similarly, the right-channel front and rear speakers 316FR and 316RR on the right side of the vehicle compartment are directed toward front and rear right-side seats 336 and 337. On the other hand, as shown in FIG. 14, the auxiliary speakers 323 are directed upward toward the front windshield 338. Furthermore, the main speakers 316 are so arranged that, for each seat occupant the nearest pair of left- and right-channel speakers located in front of the occupant are approximately equidistant from the occupant. For instance, with regard to the driver, the distance from the driver to the left-channel front main speaker 316FL and the right-side, (right-hand steering vehicle is shown) right-channel front main speaker 316FR are essentially equidistant.

The arrangement of the main speakers 316 is intended to provide a good ambience for occupants of all of the seats in the vehicle compartment. Specifically, at every seat, an acoustical image is established in front of the occupant.

On the other hand, since the acoustical axes of the auxiliary speakers 323 are directed upwards toward the front windshield which is inclined as shown in FIG. 14, the acoustical vibrations produced by the auxiliary speakers 323 are diffused or distributed in all directions to cause an echo sound by reflection from the windshield. This echo sound is delayed in the range of 0.4 msec. to 50 msec. as set forth above. Therefore, an apparent expansion of the listening space as described with respect to the foregoing embodiments can be obtained.

In practice, the left-channel front main speaker 316FL may be mounted on the center of the instrument panel 330 and the left-channel rear main speaker 316RL may be mounted on a center console 338. On the other hand, the right-channel front and rear main speakers 316FR and 316RR may be mounted on respectively corresponding side doors.

Figure 17:
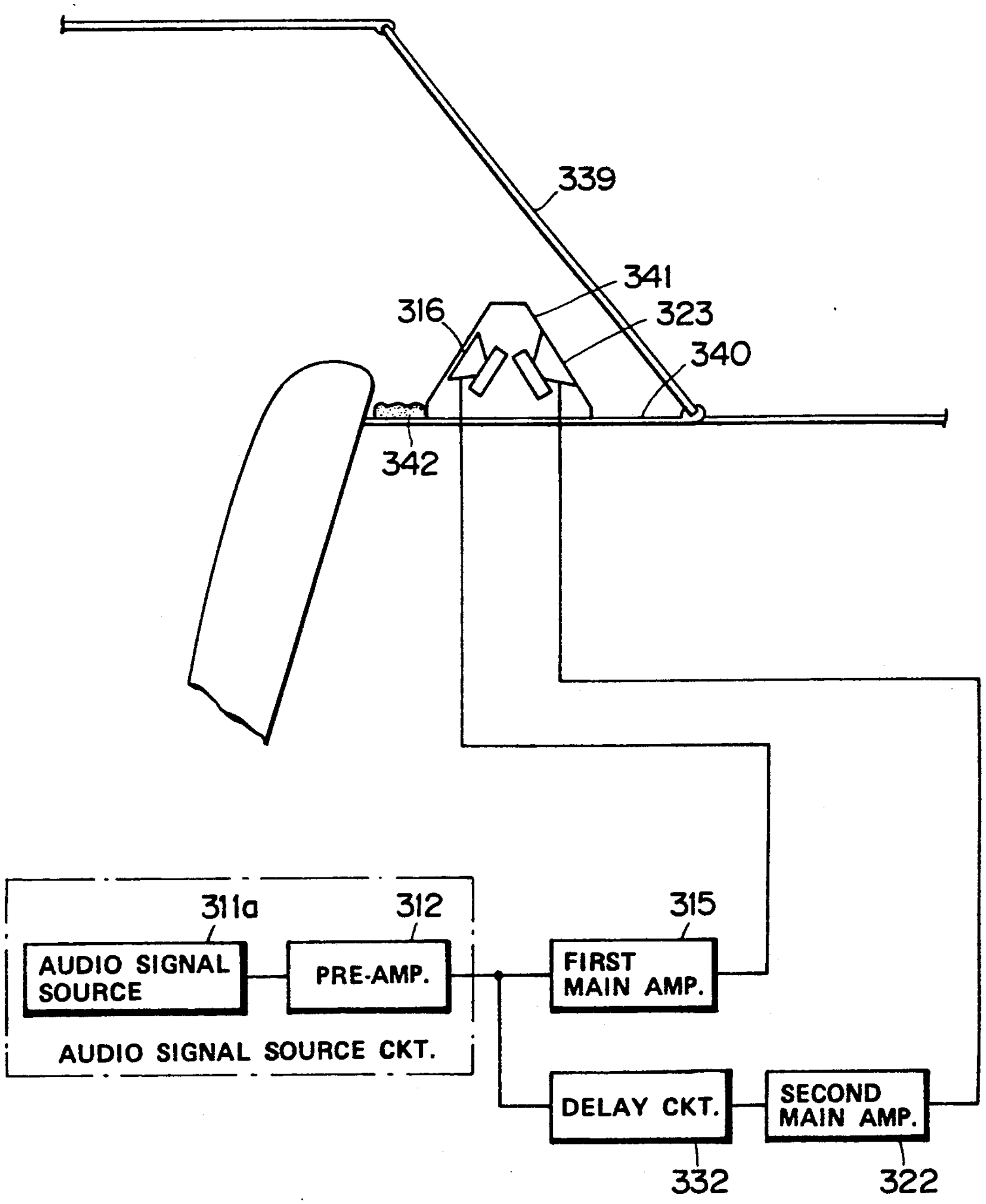
FIG. 17 is an illustration of a speaker unit employed in the third embodiment of the automotive audio system.

FIG. 17 shows a modification of the foregoing third embodiment of the present invention. In this modification, the auxiliary speaker or speakers 323 are installed in the rear of the vehicle compartment so as to cause reflection of acoustical vibrations from the rear windshield 339. The auxiliary speaker 323 is conveniently mounted on a rear parcel shelf 340. The acoustical axis of the auxiliary speaker 323 is directed toward the rear windshield.

In addition, the left-channel rear speaker 316RL is housed in a common frame 341 with the auxiliary speaker 323 and therefore commonly mounted on the rear parcel shelf 340 instead of the center console. In order to keep the reproduced sound clear, it would be advisable to provide vibration-absorbing material 342 on the surface of the rear parcel shelf 340.

Figure 18:
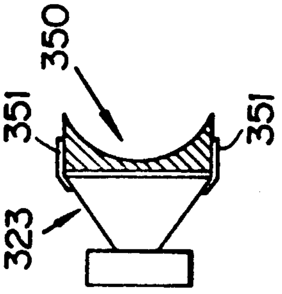
FIGS. 18, 19 and 20 show variations of the speaker units employed in the third embodiment of the automotive audio system of FIG. 16.
Figure 19:
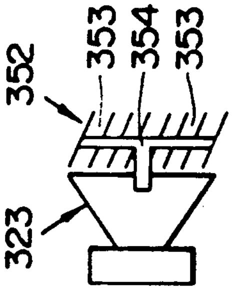

FIGS. 18 and 19 show modifications to the auxiliary speakers 323. The speakers of FIGS. 18 and 19 generate the echo sound by means of acoustical lenses. In the embodiment of FIG. 18, an acoustical concave lens 350 is employed to generate echo sound. For this purpose, the concave lens 350 is aligned along the acoustical axis of the speaker 323. The lens 350 is secured to the frame of the speaker by means of an appropriate stay or stays 351. On the other hand, in the embodiment of FIG. 19, a lens 352 comprises a plurality of parallel metal strips 353 spaced at regular intervals. The lens 352 is mounted in front of the speaker 323 by means of a stay 354.

With the embodiments of FIGS. 18 and 19, since the speakers per se are able to generate the echo sound by means of the lenses 350 and 352, the position of the auxiliary speaker 323 need not be limited to near the front and/or rear windshields.

Figure 20:
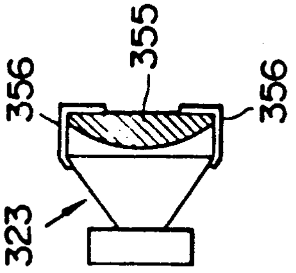

FIG. 20 shows another modification to the auxiliary speaker. In this modification, a convex reflector plate 355 is used to generate echo sound. The reflector plate 355 is convex towards the speaker and mounted on the speaker frame by means of a stay 356. In this case, the characteristics of the echo sound to be generated can be varied by changing the material of the reflector plate and the curve of the convex lens.

Figure 21:
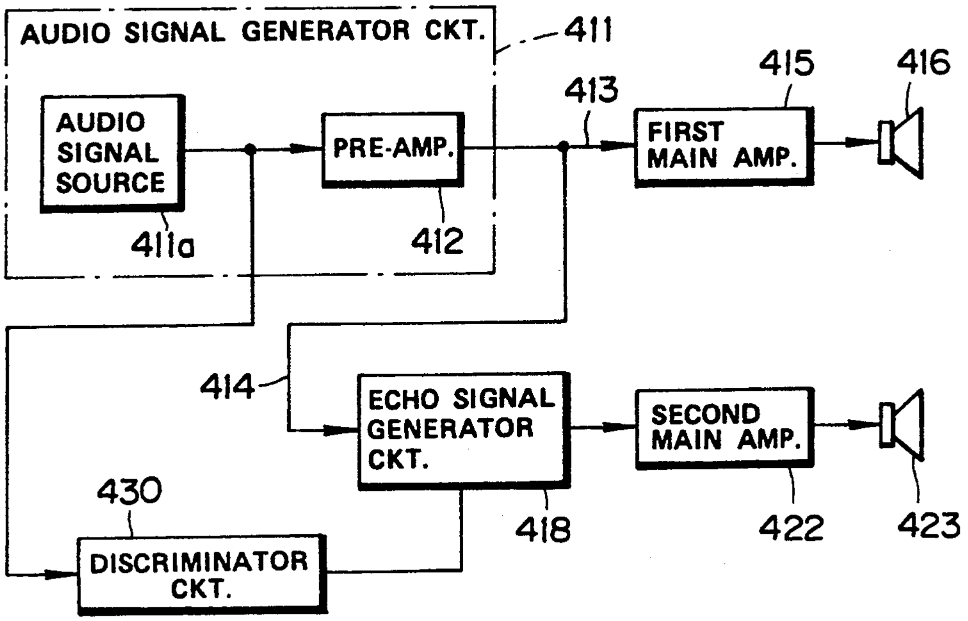
FIG. 21 is a schematic block diagram of the fourth embodiment of an automotive audio system according to the invention.
Figure 22:
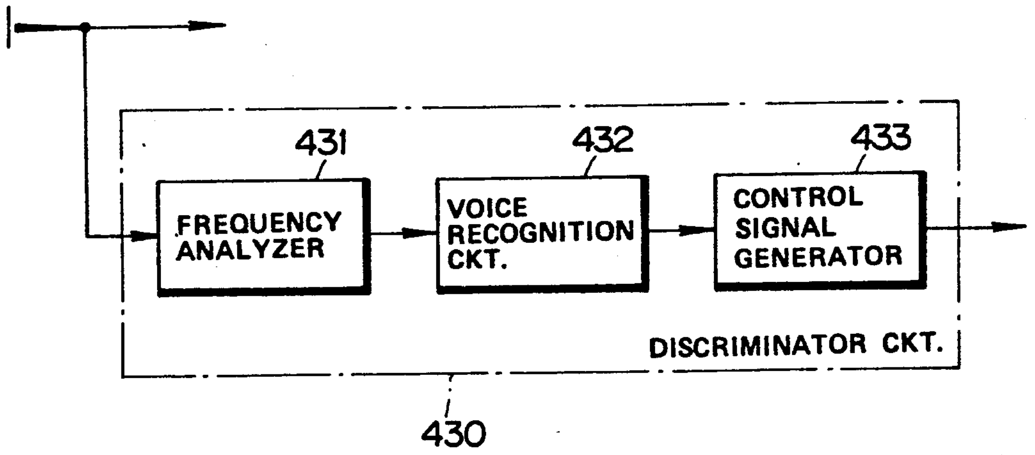
FIG. 22 is a block diagram of a discriminator circuit in the fourth embodiment of the automotive audio system of FIG. 21.

FIGS. 21 and 22 show the fourth embodiment of the automotive audio system according to the invention. In this embodiment, a discriminator circuit 430 is added to the first embodiment of FIG. 1. The discriminator circuit 430 is connected for input from an audio signal source 411*a* upstream of the pre-amplifier 412, and, for output to an echo signal generator circuit 418 in a second circuit 414 which also includes a second main amplifier 422 and an auxiliary amplifier 423. A main speaker 416 is connected to the audio signal source 411*a* through the pre-amplifier 412 and the first main amplifier 415 in a manner substantially the same as in the first embodiment.

The discriminator circuit 430 is designed to discriminate between music and non-musical voice, such as a human talking. In the case of music, it would be advantageous to generate echo sound in order to achieve the acoustical expansion effect described above. On the other hand, in the case of human speech, it would be better to avoid echo sound to ensured that the human speech can be heard clearly.

Therefore, according to the shown embodiment, the delay imposed by the second circuit 414 is adjusted according to the result of discrimination made by the discriminator circuit 430. Specifically, when music is detected, the delay is selected to be in the range of 10 msec. to 35 msec. On the other hand, when voice is detected, the delay time for the echo sound is adjusted to less than 10 msec. Hereafter, the delay time (i.e. 10 msec. to 35 msec.) for music will be referred to as "first delay time" and the delay time (i.e. less than 10 msec.) for voice will be referred to as "second delay time".

The discriminator circuit 430 switches the delay time in the echo signal generator circuit 418 between the first and second delay times. Therefore, the discriminator circuit 430 outputs to the echo signal generator circuit 418 a discriminator signal which has a value variable between a first value representative of music and a second value representative of voice. The echo sound generator circuit 418 is responsive to the discriminator signal from the discriminator circuit 430 to adjust the delay time.

FIG. 22 shows one example of the discriminator circuit 430 in the shown embodiment of FIG. 21. In this example, the discriminator circuit 430 discriminates between music and voice on the basis of the frequency spectrum of the sound to be reproduced.

In order to distinguish between music and voice, there is provided a frequency analyzer 431, a voice recognition circuit 432 and a control signal generator 433. The control signal generator 433 outputs a signal serving as the discriminator signal ordering adjustment of the delay time between the first delay time and second delay time.

The frequency analyzer 431 receives the audio signal from the audio signal source, such as a CD player, tape player, radio tuner and so forth. The frequency analyzer analyzes the audio signal frequency spectrum and outputs the result to the voice recognition circuit 432. The voice recognition circuit 432 distinguishes between music and voice on the basis of the output of the frequency analyzer 431. The voice recognition circuit 432 outputs a signal indicative of the result.

Figure 23:
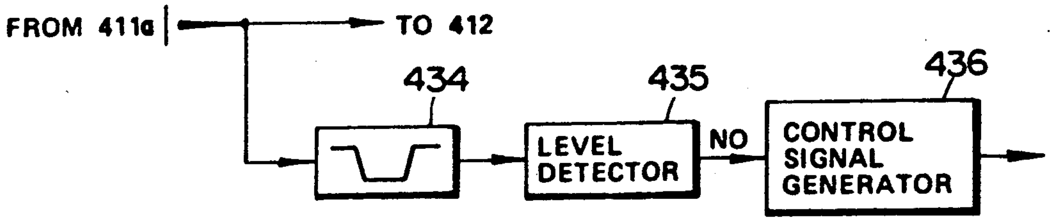
FIG. 23 is a block diagram of another embodiment of the discriminator circuit in the fourth embodiment of the automotive audio system of FIG. 21.

FIG. 23 shows another example of the discriminator circuit 430. In this example, a filter 434 filters out audio signal components in the voice frequency range. The filter 434 is connected to a level detector 435 which monitors the output level of the filter. The level detector 435 compares the output level of the filter 434 with a predetermined threshold. If the filter output level is higher than the threshold, then music is recognized. On the other hand, if the filter output level is lower than the threshold, voice is recognized. The detector 435 produces a detector signal having a value variable between HIGH and LOW depending on the filter output level. The control signal generator 436 is responsive to the detector signal to feed the discriminator signal to the echo signal generator 418 to switch the delay time between the first delay time and the second delay time.

Figure 24:
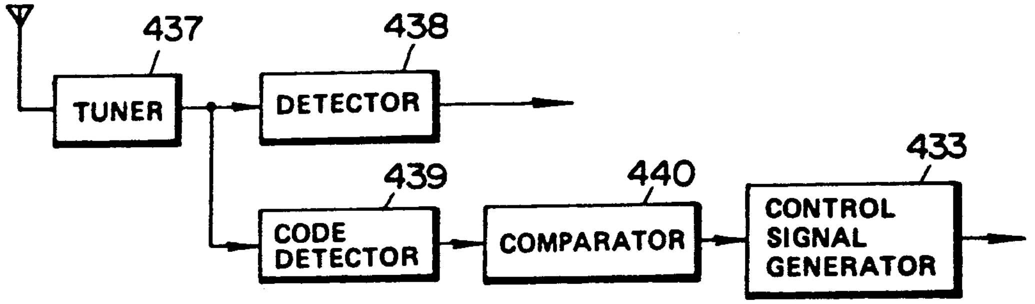
FIG. 24 is a block diagram of a further embodiment of the discriminator circuit in the fourth embodiment of the automotive audio system of FIG. 21.

FIG. 24 is a further example of the discriminator circuit 430 which is specifically adapted to discriminate between music and voice in audio signals from radio tuners. This example is designed to detect a program code in the broadcast signal which identifies the radio program.

The radio receiver circuit serving as the audio signal source 411 includes an antenna, a tuner 437 and a detector 438. A code detector 439 detects the aforementioned program code in the radio signal received from the tuner 437. The code detector 439 extracts the program code component from the radio signal and sends it to a comparator 440. The comparator 440 holds one or more program codes identifying programs such as news, weather report, traffic information and so forth. The comparator 440 compares the received code with the preset codes. The comparator 440 outputs a comparator signal variable between HIGH and LOW level depending on the results of the comparison. The comparator signal level goes HIGH when the received program code matches the present code. Therefore, the HIGH-level comparator signal is representative of voice sound. On the other hand, when the comparator signal is LOW, it represents music. The control signal generator 433 is responsive to the comparator signal to send the discriminator signal to the echo signal generator 418 for switching between the first and second delay times.

Figure 25:
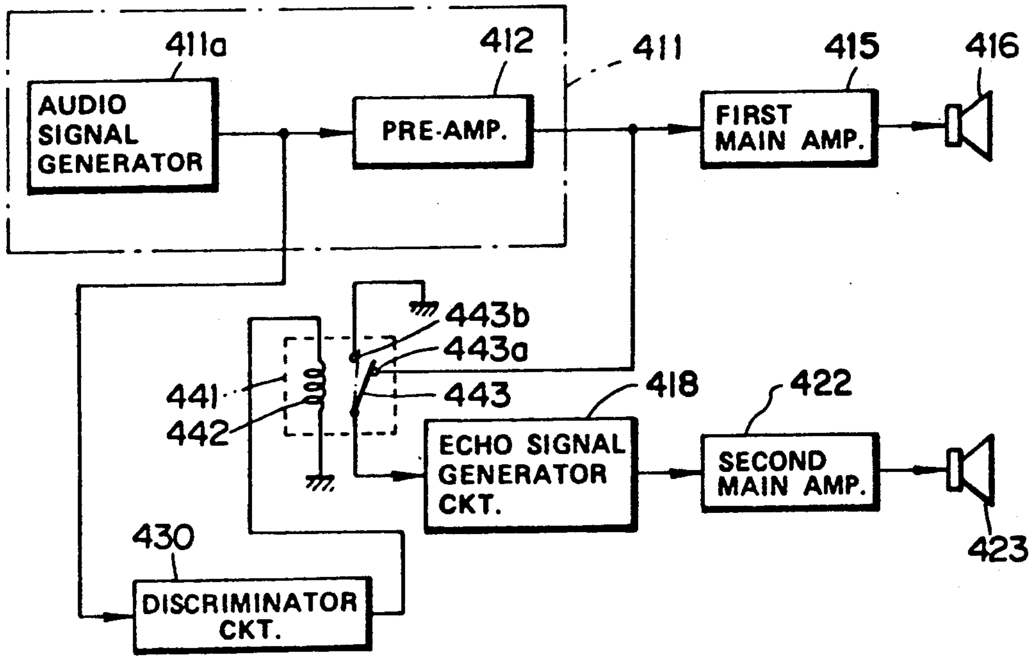
FIG. 25 is a modification of the fourth embodiment of the automotive audio system of FIG. 21.

FIG. 25 shows a modification to the fourth embodiment of the automotive audio system according to the invention. In this embodiment, a switching relay 441 is provided between the pre-amplifier 412 and the echo signal generator 418. The switching relay 441 includes relay coil 442 connected to the discriminator circuit 430.

In this modification, the discriminator circuit 430 outputs a HIGH-level discriminator signal when the audio sound to be reproduced is vocal sound and a LOW-level discriminator signal when the reproduced sound is music.

The switching relay 441 has a movable contact 443 normally in contact with a terminal 443*a* which is connected to the pre-amplifier 412. When the movable contact 443 is held in contact with the terminal 443*a*, the output of the pre-amplifier 412 is sent to the echo signal generator circuit 418. When the relay coil 442 is energized by the HIGH-level discriminator signal from the discriminator circuit 430, the movable contact 443 moves into contact with the other terminal 443*b* to connect the echo signal generator circuit 418 to ground.

Therefore, in this modification, the echo signal generator circuit 418 is disabled during speech and thus the auxiliary speaker 423 will not reproduce sound. In this case, the voice sound is reproduced only by the main speaker without echo.

Figure 26:
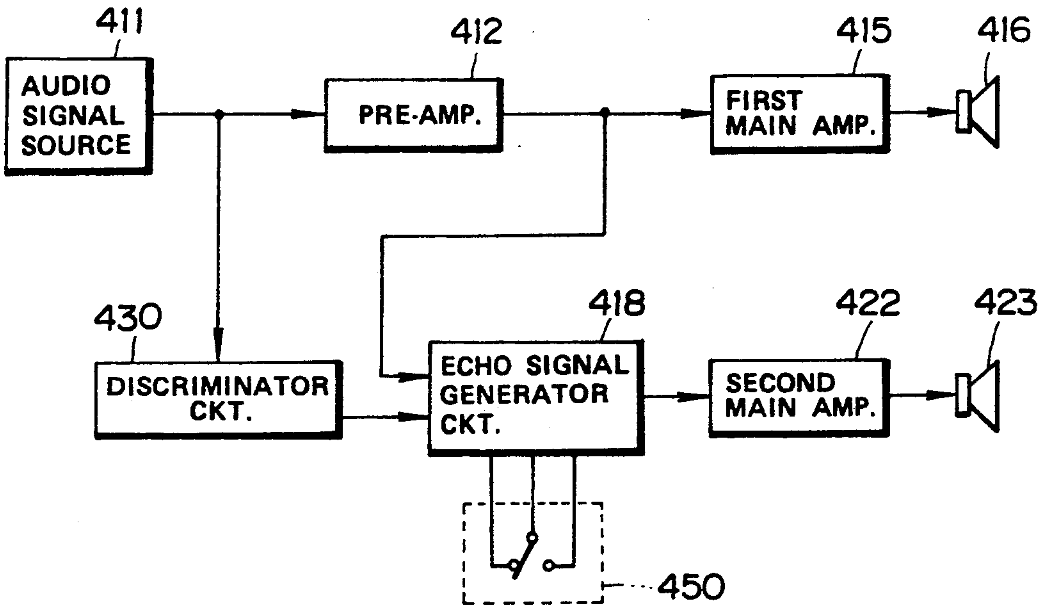
FIG. 26 is another modification of the fourth embodiment of the automotive audio system of FIG. 21.
Figure 27:
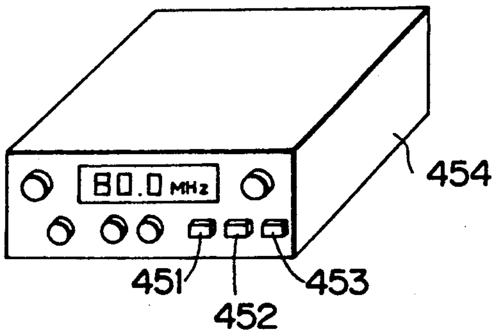
FIG. 27 is a perspective view of an amplifier to be employed in the automotive audio system of FIG. 26.

FIGS. 26 and 27 show another modification of the foregoing fourth embodiment of FIG. 21. This modification enables manual control of the echo signal generator 418. A manually operable selector switch 450 allows manual control of the echo signal generator 418. The selector switch 450 is associated with selector buttons 451, 452 and 453, which are mounted on an amplifier casing 454. The selector button 451 is adapted to be selected when listening to speech, such as news, weather reports, announcements and so forth. The selector switch 450 is responsive to depression of the selector button 451 to disable the echo signal generator 418. Alternatively, it would be possible to minimize the delay time to less than 10 msec. in response to depression of the selector button 451. The selector button 452 is to be depressed when listening to music. The echo signal generator 418 is responsive to depression of the selector button 452 to be enabled or, alternatively, to set the delay time to the given range, i.e. 10 msec. to 35 msec.

The selector button 453 is designed to select an AUTO mode. When the AUTO mode is selected by depression of the selector switch 453, the echo signal generator circuit 418 is connected to the discriminator circuit 430 to control the delay time by means of the discriminator signal.

Figure 28:
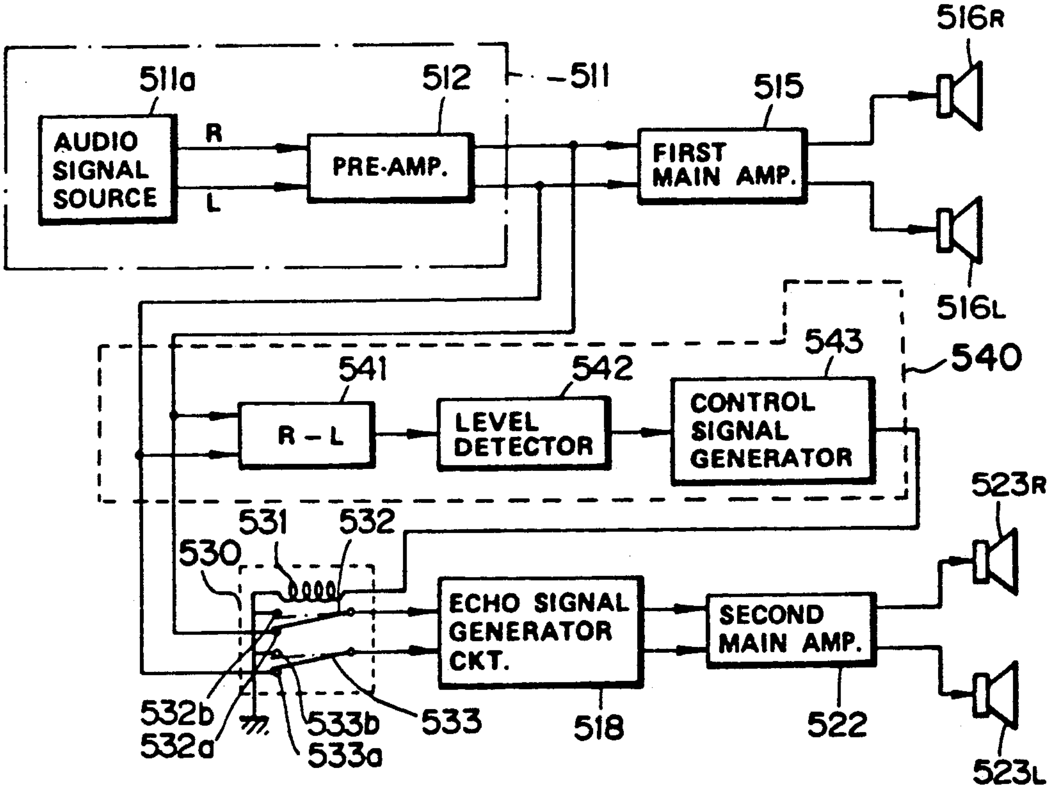
FIG. 28 is a schematic block diagram of the fifth embodiment of the automotive audio system according to the invention.

FIG. 28 shows a fifth embodiment of an automotive audio system according to the present invention. This embodiment is especially suitable for application to stereo audio systems and controls the echo signal generator in accordance with the difference in signal level between the left and right channels.

For this, the audio system is provided with left- and right-channel main speakers 516L and 516R which are connected to an audio signal source 511*a* through a pre-amplifier 512 and a first main amplifier 515. The pre-amplifier 512 and the first main amplifier 515 comprise stereo amplifiers. The audio system also has left- and right-channel auxiliary speakers 523L and 523R. The left- and right-channel auxiliary speakers 523L and 523R are connected to the audio signal source 511*a* via the pre-amplifier 512, an echo signal generator circuit 518 and a second main amplifier 522 which comprises a stereo amplifier.

Between the pre-amplifier 512 and the echo signal generator circuit 518, a relay circuit 530 is provided. The relay circuit 530 includes a relay coil 531 and movable contacts 532 and 533 for each of the left and right channels. The movable contacts 532 and 533 normally contact the terminals 532*a* and 533*a* connected to the pre-amplifier to connect the echo signal generator circuit 518 to the pre-amplifier. On the other hand, when the relay coil 531 is energized, the movable contacts 532 and 533 are switched to connect the echo signal generator circuit 518 to ground.

A monaural reproduction detecting circuit 540 controls energization and deenergization of the relay coil. The monaural sound reproduction detecting circuit 540 comprises a subtracting circuit 541, a level detector 542 and a control signal generator 543. The subtracting circuit 541 is connected to the pre-amplifier 512 to receive the left and right channels of audio signals and derives the signal level difference therebetween. The subtracting circuit 541 outputs a signal level difference indicative signal to the level detector 542. The level detector 542 is responsive to the signal level difference indicative signal to compare the signal level with a given threshold value. In general, vocal sounds, such as news, weather reports, announcements and so forth, are reproduced monaurally. Therefore, the signal levels of the left and right channels should be equal. As a result, the difference derived by the substracting circuit 541 should be zero. Therefore, the given value in the level detector 542 will be zero.

The control signal generator 543 is responsive to the output of the level detector 542 indicative of a zero-difference to output a HIGH-level control signal to the relay coil 531. The relay coil 531 is thus energized to connect the echo signal generator 518 to the ground.

Figure 29:
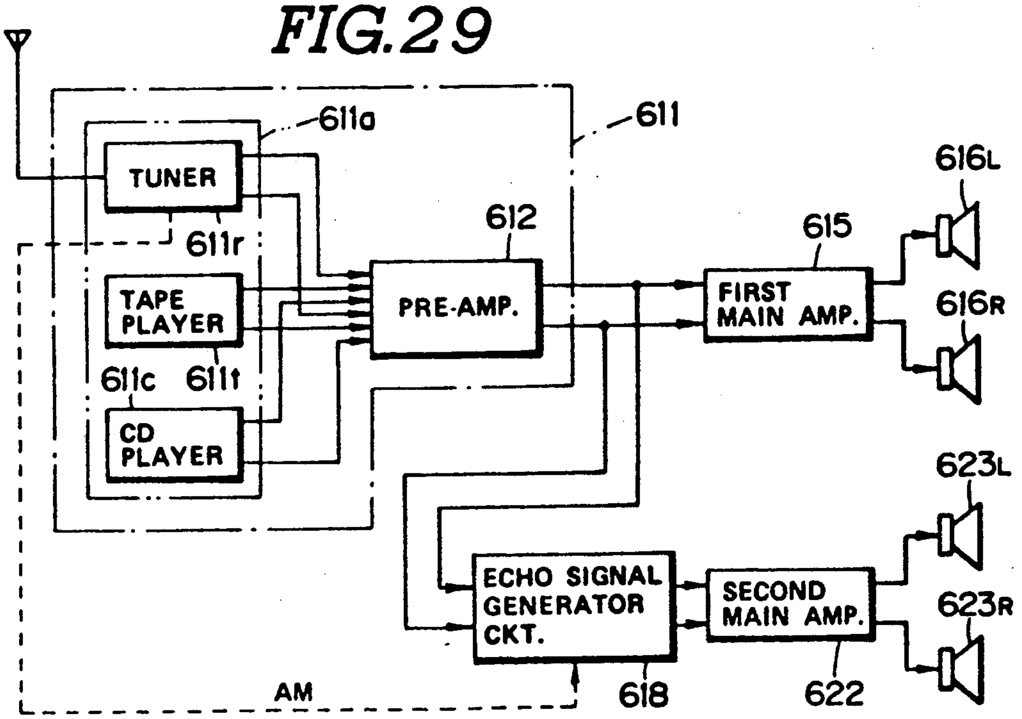
FIG. 29 is a schematic block diagram of the sixth embodiment of the automotive audio system according to the invention.

FIG. 29 shows the sixth embodiment of an automotive audio system according to the invention, in which a echo signal generator circuit 618 is disabled when AM reception is selected through a radio tuner 611*r*.

In this embodiment, the radio tuner 611*r*, a cassette tape player 611*t* and a CD player 611*c* form the audio signal source and are selectively operable for generating audio signals. The radio tuner 311*r* is adapted to receive at least AM signals. As will be appreciated, the radio tuner may also receive FM signals and in this case, has an AM/FM selector. The radio tuner 611*r*, the cassette tape player 611*t* and the CD player 611*c* are each connected to left- and right-channel main speakers 616L and 616R through a pre-amplifier 612 and a first main amplifier 615, and also connected to left- and right-channel auxiliary speakers 623L and 623R through the pre-amplifier 612, the echo signal generator circuit 618 and a second main amplifier 622. The AM/FM selector in the radio tuner 611*r* is connected to the echo signal generator 618. The echo signal generator 618 is responsive to an AM selection indicative signal from the AM/FM selector to shorten the delay time to less than 10 msec. or, otherwise, to cease transmission of the audio signal to the second main amplifier 622 so as to stop reproduction through the auxiliary speakers 623L and 623R.

Figure 30:
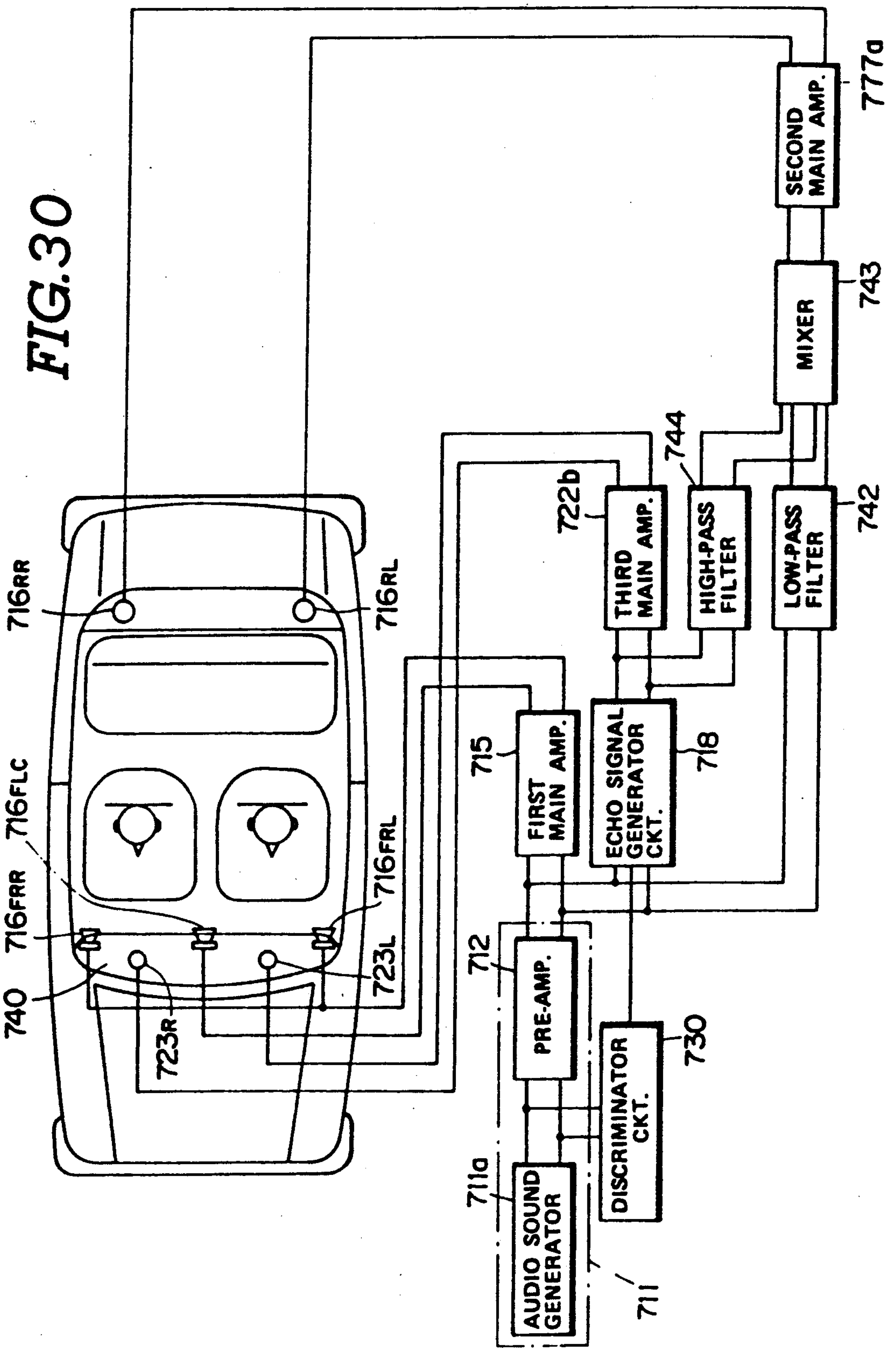
FIG. 30 is a diagram of the seventh embodiment of the automotive audio system according to the invention.

FIG. 30 shows the seventh embodiment of an automotive audio system, in which a discriminator circuit 730 operates in substantially the same manner as the discriminator circuit 430 in the fourth embodiment. An echo signal generator circuit 718 also operates in substantially same manner as the echo signal generator circuit 418 in the fourth embodiment. Specifically, the echo signal generator circuit 730 switches its delay time between the first delay time and the second delay time as set out with respect to the fourth embodiment.

The shown embodiment includes five main speakers. Among these five, three speakers 716FRL, 716FLC and 716FRR are installed on an instrument panel 740. The main speakers 716FRL and 716FRR reproduce right-channel audio sound and are installed at opposite ends of the instrument panel 740. On the other hand, the speaker 716FLC reproduces left-channel sound and is installed at the center of the instrument panel. The two remaining speakers 716RL 716RR are installed on a rear parcel shelf 741. The main speakers 716 FRL, 716FLC and 716FRR are connected to the audio signal source 711*a* through a pre-amplifier 712 and a first main amplifier 715. Similarly, the main speakers 716RL and 716RR are connected to the audio signal source 711*a* via the pre-amplifier 712, a low-pass filter 742, a mixer 743 and a second main amplifier 722*a*. A pair of auxiliary speakers 723L and 723R are also installed on the instrument panel 740. The auxiliary speakers 723L and 723R are connected to the audio signal source 711*a* through the pre-amplifier 712, an echo signal generator circuit and a third main amplifier 722*b*. The echo signal generator circuit 718 is also connected to the mixer 743 via a high-pass filter.

The echo signal generator circuit 718 is also connected to the discriminator circuit 730 to receive the discriminator signal. As set forth with respect to the fourth embodiment, the discriminator circuit 730 recieves audios signal from the audio signal source 711*a* and discriminates between music and voice in the received signal. When the audio signal from the audio signal source 711*a* consists of music, the delay time of the echo signal generator circuit 718 is set to the first delay time, i.e. in the range of 10 msec. to 35 msec. On the other hand, when the audio signal is voice, the delay time of the echo signal generator circuit 718 is set to the second delay time, i.e. less than 10 msec.

In the shown arrangement, the three main speakers 716FRL, 716FLC and 716FRR directly reproduce the audio signal transmitted directly from the audio signal source 711*a* through the pre-amplifier 712 and the first main amplifier 715. On the other hand, the mixer 743 receives low-frequency components of the audio signal directly from the audio signal source 711*a* without any delay. On the other hand, the mixer 743 receives the high-frequency components through the echo signal generator circuit 718 after the first or second delay time. Therefore, the sound reproduced through the two rear speakers 716RL and 716RR is composed of the low-frequency, directly reproduced component and the high-frequency delayed component. This provides acoustical expansion.

As will be appreciated, the auxiliary speakers 723L and 723R also reproduce delayed echo sound for acoustical expansion for better ambience as set forth with respect to the preceding embodiments It should be appreciated that, while the directly transmitted, low-frequency components and the delayed higher-frequency components are mixed in the mixer, the mixed components should not interfere due to difference in their frequency ranges. Therefore, audio sound can be reproduced clearly through the two rear main speakers 716RL and 716RR.

Figure 31:
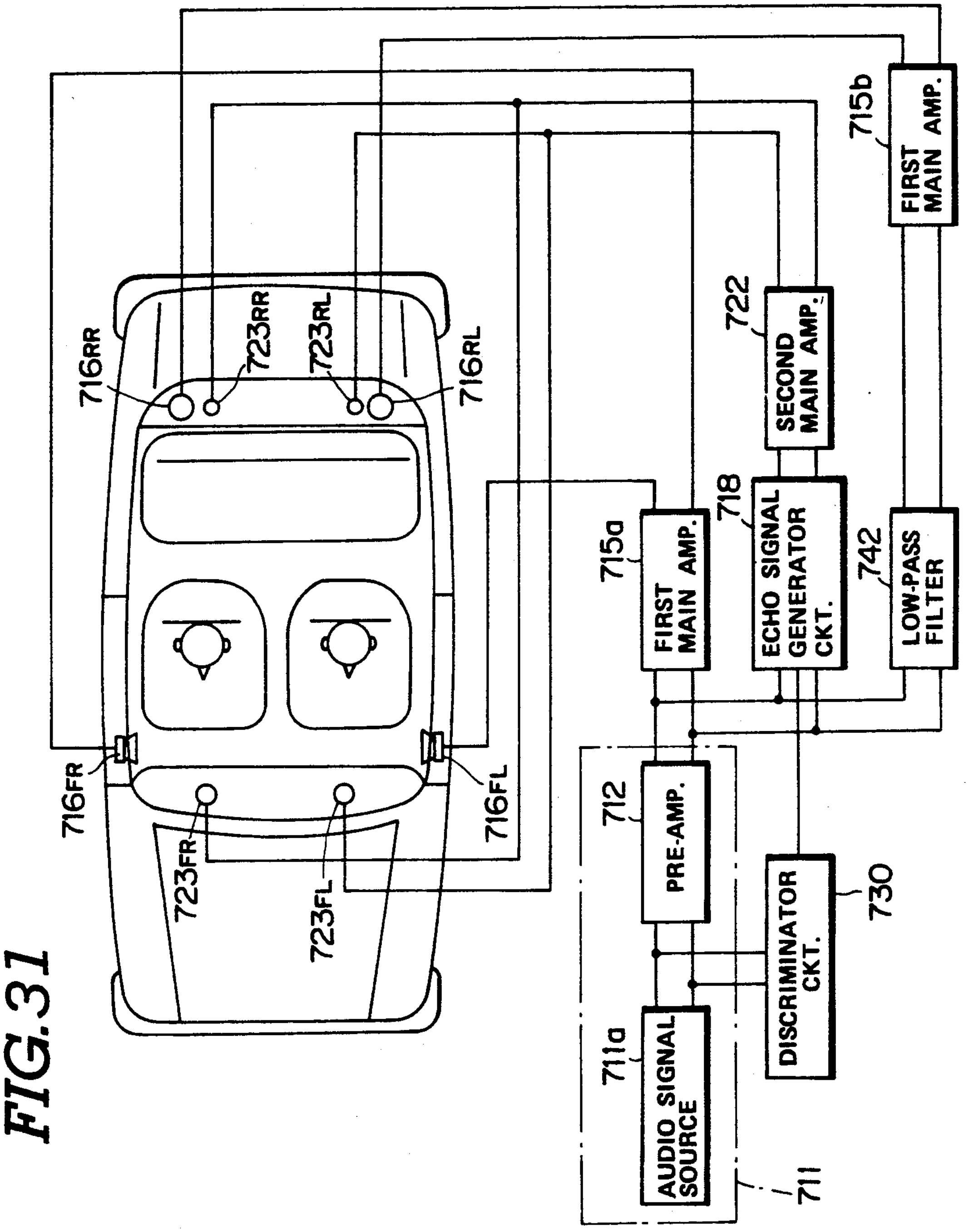
FIG. 31 is a diagram of the eighth embodiment of the automotive audio system according to the invention.

FIG. 31 shows a modification to the seventh embodiment of the automotive audio system according to the invention. This modification employs four main speakers, i.e. a left-channel front main speaker 716FL, a right-channel front main speaker 716FR, a left-channel rear main speaker 716RL and a right-channel rear main speaker 716RR. There are also four auxiliary speakers, i.e. a left-channel front auxiliary speaker 723FL, a right-channel front auxiliary speaker 723FR, a left-channel rear auxiliary speaker 723RL and a right-channel rear auxiliary speaker 723RR.

The left- and right-channel rear main speakers 716RL and 716RR are connected to the audio signal source 711*a* via the pre-amplifier 712, the low-pass filter 742 and the first rear main amplifier 715*b*. On the other hand, the auxiliary speakers 723FL, 723FR, 723RL and 723RR are connected to the echo signal generator 718 to receive the delayed echo sound.

In this case, the rear main speakers 716RL and 716RR comprise woofer for higher quality reproduction of bass sound.

As in the preceding embodiment, the echo signal delay time is controlled between the first and second delay times by the discriminator 730.

Figure 32:
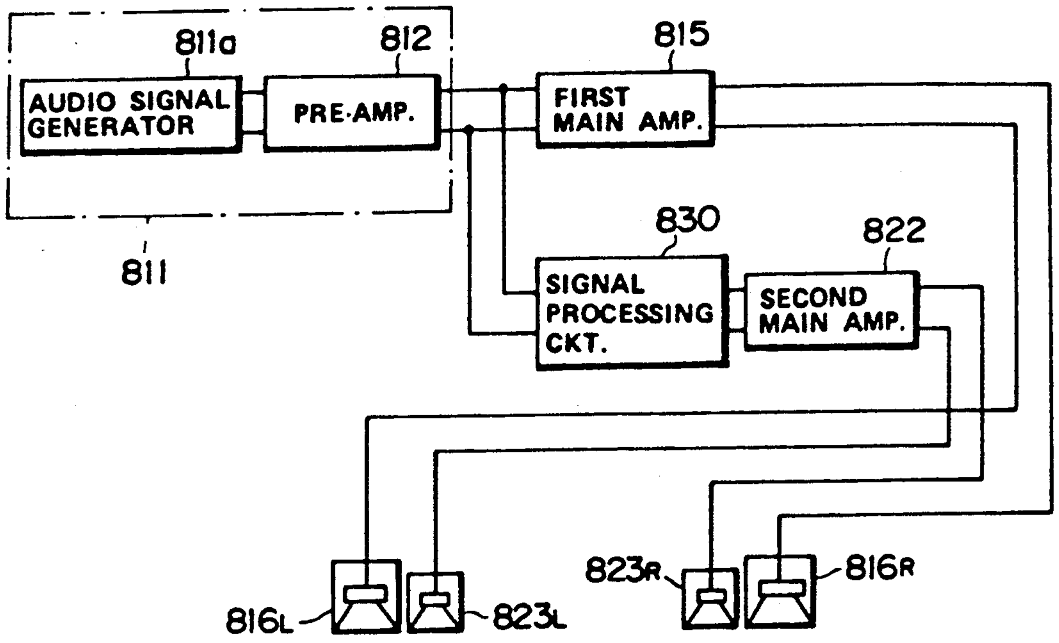
FIG. 32 is a schematic block diagram of the ninth embodiment of the automotive audio system according to the invention.

FIG. 32 shows the eight embodiment of an automotive audio system according to the invention. This embodiment essentially corresponds to the embodiment of FIG. 7, but the echo signal generator 118 in FIG. 7 is replaced with a signal processing circuit 830.

The shown embodiment comprises an audio signal source 811*a* which generates audio signals to be reproduced through left- and right-channel main speakers 816L and 816R and through left- and right-channel auxiliary speakers 823L and 823R. The left- and right-channel main speakers 816L and 816R are connected to the audio signal source 811*a* via a pre-amplifier 812 and a first main amplifier 815. On the other hand, the auxiliary speakers 823L and 823R are connected to the audio signal source 811*a* via the pre-amplifier 812, the signal processing circuit 830 and a second main amplifier 822.

The signal processing circuit 830 phase-shifts and/or delays the audio signals. The operation of the signal processing circuit 830 is intended to provide better ambience for the automotive audio system as in preceding embodiments.

Figure 34:
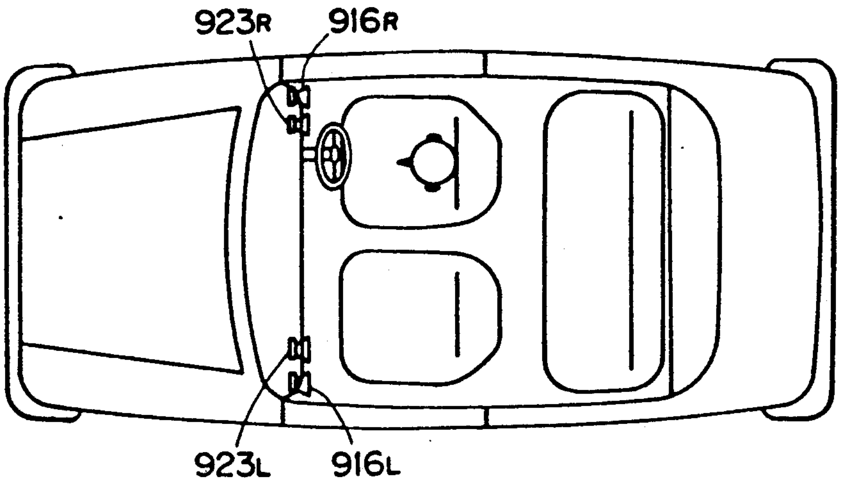
FIG. 34 is an illustration of an automotive vehicle, to which the tenth embodiment of the automotive audio system is installed.
Figure 33:
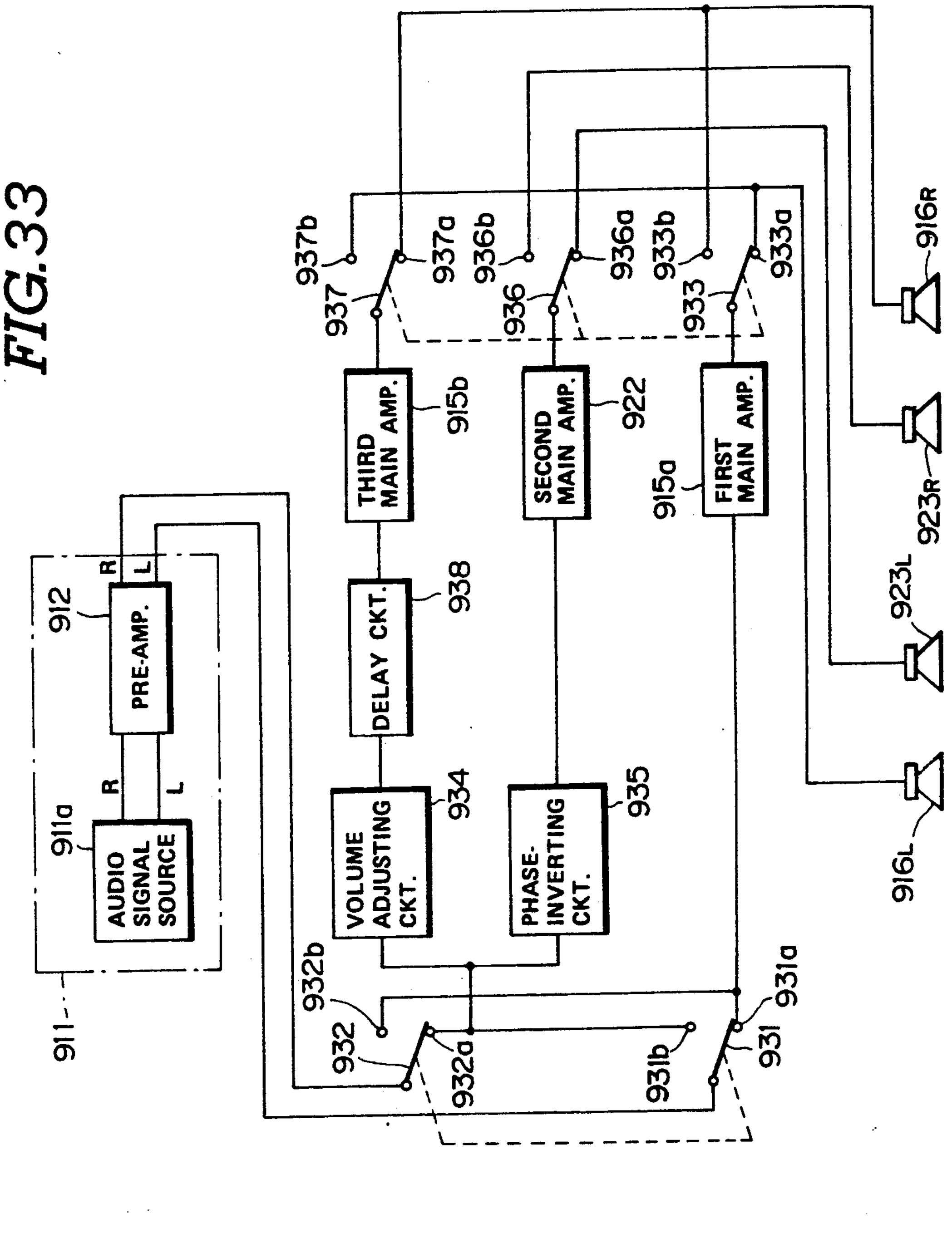
FIG. 33 is a schematic block diagram of the tenth embodiment of the automotive audio system according to the invention.

FIGS. 33 and 34 show the ninth embodiment of an automotive audio system according to the present invention, which as shown in FIG. 34, employs left- and right-channel main speakers 916L and 916R and left- and right-channel auxiliary speakers 923L and 923R. The main and auxiliary speakers 916L, 916R, 923L and 923R are installed on an instrument panel 940. The left-channel main and auxiliary speakers 916L and 923L are mounted side-by-side on the left-hand end of the instrument panel 940. Likewise, the right-channel main and auxiliary speakers 916R and 923R are mounted side-by-side on the right-hand end of the instrument panel 940.

The audio system in this embodiment comprises an audio signal source 911*a* and a pre-amplifier 912. The left-channel output of the pre-amplifier 912 is connected to a first movable contact 931 which is movable between terminals 931*a* and 931*b*. Likewise, the right-channel output of the pre-amplifier 912 is connected to a second movable contact 932 which is movable between terminals 932*a* and 932*b*. The terminals 931*a* and 932*b* are connected to a third movable contact 933 via a first main amplifier 915*a*. The third movable contact 933 is movable between terminals 933*a* and 933*b* which are respectively connected to the left- and right-channel main speakers 916L and 916R.

The terminals 931*b* and 932*a* are connected to a volume adjusting amplifier 934 and a phase-inverting circuit 935. The phase-inverting circuit 935 is connected to a fourth movable contact 936 via a second main amplifier 922. The fourth movable contact 936 is movable between terminals 936*a* and 936*b* which are respectively connected to left- and right-channel auxiliary speakers 923L and 923R. On the other hand, the volume adjusting amplifier 934 is connected to a fifth movable contact 937 via a delay circuit 938 and a third main amplifier 915*b*. The fifth movable contact 937 is movable between terminals 937*a* and 937*b* respectively connected to the left- and right-channel main speakers 916L and 916R.

The first and second movable contacts 931 and 932 move together between a first switch position where the first movable contact 931 is connected to the terminal 931*a* and the second movable contact is connected to the terminal 932*a*, and a second switch position where the first movable contact 931 is connected to the terminal 931*b* and the second movable contact 932 is connected to the terminal 932*b*. Similarly, the third, fourth and fifth movable contacts 933, 936 and 937 cooperatingly shift between a third switch position where the contacts are connected to the terminals 933*a*, 936*a* and 937*a* respectively and a fourth switch position where the contacts are connected to the terminals 933*b*, 936*b* and 937*b* respectively.

In more detail, at the first switch position the first movable contact 931 is connected to the terminal 931*a* and the second movable contact 932 is connected to the terminal 932*a*, so that the left-channel output of the pre-amplifier 912 is connected to the first main amplifier directly and the right-channel output of the pre-amplifier is connected to the volume adjusting amplifier 934 and the phase inverting circuit 935. On the other hand, at the second switch position the first movable contact 931 is connected to the terminal 931*b* and the second movable contact 932 is connected to the terminal 932*b*, so that the right-channel output of the pre-amplifier 912 is connected to the first main amplifier directly and the left-channel output of the pre-amplifier is connected to the volume adjusting amplifier 934 and the phase inverting circuit 935.

At the third switch position, the volume adjusting amplifier is connected to the right-channel main speaker 916R via the delay circuit 938 and the third main amplifier 915*b*, and the phase-inverting circuit 935 is connected to the left-channel auxiliary speaker 923L via the second main amplifier 922 and the first amplifier 915*a* is connected to the left-channel main speaker 916L. At the fourth switch position, the volume adjusting amplifier is connected to the left-channel main speaker 916L via the delay circuit 938 and the third main amplifier 915*b* and the phase-inverting circuit 935 is connected to the right-channel auxiliary speaker 923R via the second main amplifier 922 and the first amplifier 915*a* is connected to the right-channel main speaker 916R.

As shown in FIG. 33, the first and second movable contacts 931 and 932 cooperate with the third, fourth and fifth movable contacts 933, 936 and 937 so that, when the first and second movable contacts 931 and 932 are in the first switch position, the third, fourth and fifth movable contacts 933, 936 and 937 are in the third switch position.

In this arrangement, the movable contacts 931, 932, 933, 936 and 937 can be operated manually by the occupant or occupants of the vehicle compartment to obtain better ambience. In general the movable contacts are used in the following manner: when the driver is the only listener of the audio system, the right-channel auxiliary speaker 923R, which is closest to the driver (in the case of a right-hand steering vehicle), is disabled and thus does not reproduce audio sound. On the other hand, in this case, the left-channel main speaker 916L, which is farthest from the driver, is connected to the first main amplifier 915*a* to reproduce audio sound based on the audio signal received directly from the audio signal source, the left-channel auxiliary speaker 923L is connected to the phase inverting circuit 935 via the second main amplifier 922 for reproducing phase-inverted audio sound, and the right-channel main speaker 916R which is farthest from the driver, is connected to the volume adjusting amplifier 934 to received an attenuated and delayed audio signal. With this arrangement, the loudness level of sound reproduced by the right-channel main speaker 916R is decreased relative to the left-channel main speaker. The difference in the loudness level should be adequate for establishing an acoustical image in front of the driver. In addition, by delaying the audio sound reproduced through the right-channel speaker 916R and the phase-inverted sound from the left-channel auxiliary speaker 923L, satisfactory acoustical expansion can be obtained for better ambience.

Figure 35:
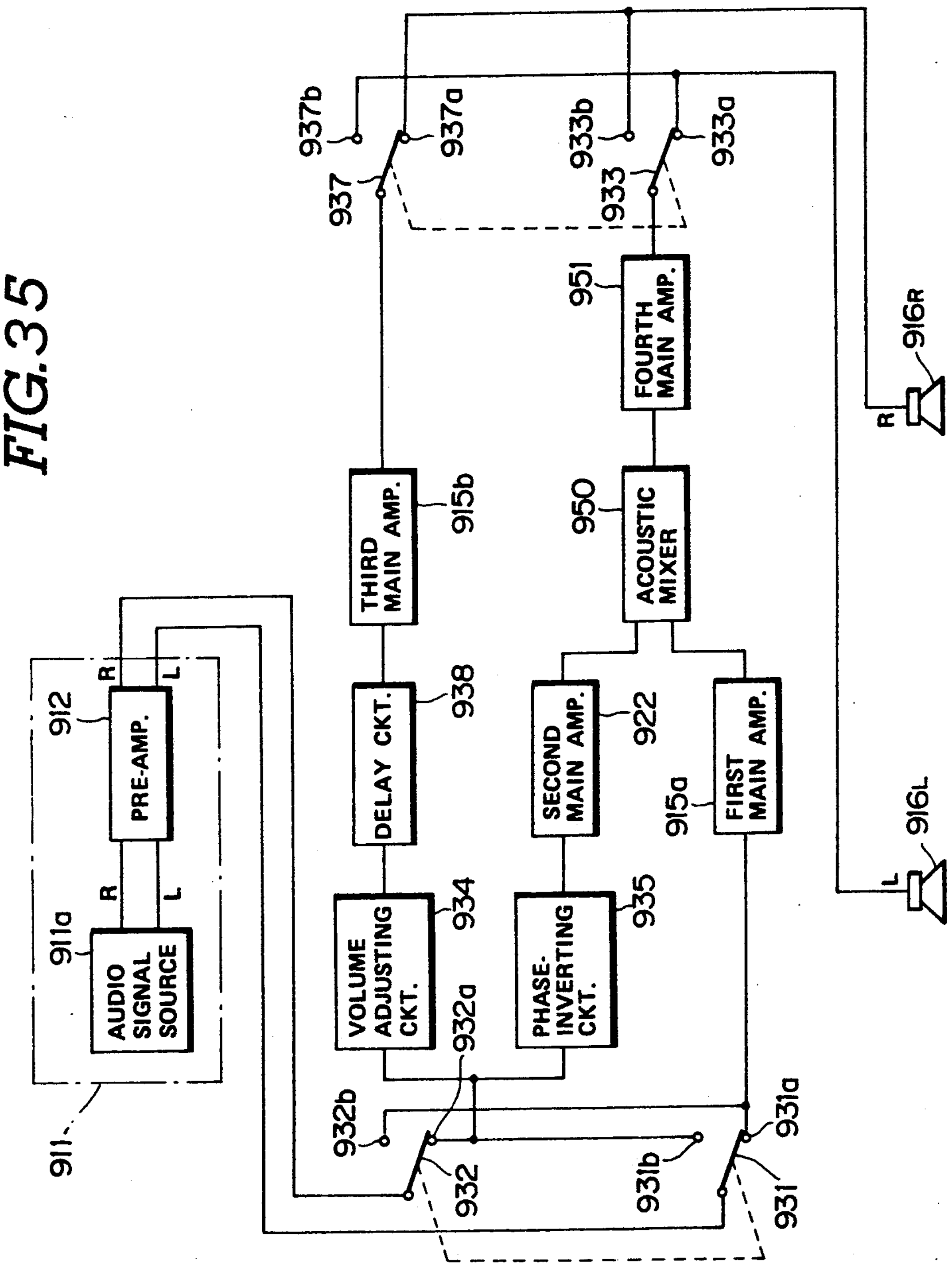
FIG. 35 is a schematic block diagram of a eleventh embodiment of the automotive audio system according to the present invention.

FIG. 35 shows a modification to the ninth embodiment of the automotive audio system according to the present invention. This embodiment uses only left-and right-channel main speakers 916L and 916R. Therefore, the fourth movable contact 936 and its terminals 936*a* and 936*b* are unnecessary. The phase-inverting circuit 935 is then connected to an acoustical mixer 950 through the second main amplifier 922. The first amplifier 915*a* is also connected to the acoustical mixer 950. The acoustical mixer 950 is in turn connected for output to the third movable contact 933 via a fourth main amplifier 951.

Figure 36:
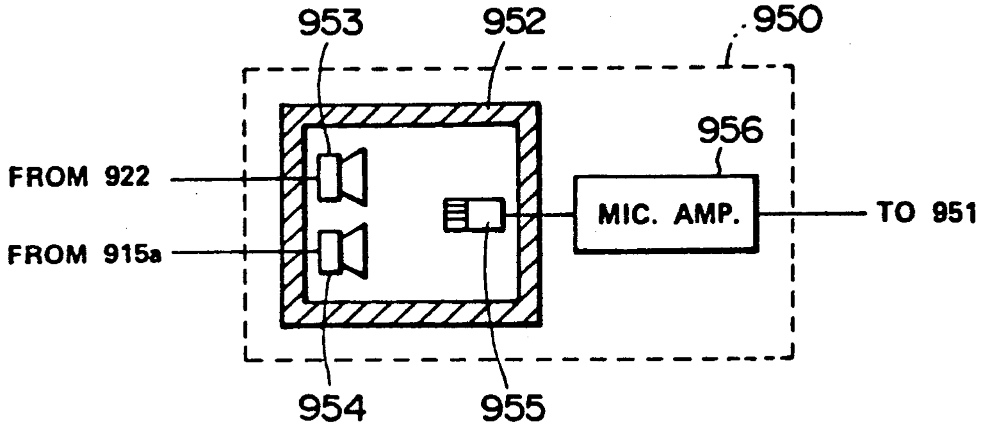
FIG. 36 is a fragmentary illustration of an audio mixer employed in the eleventh embodiment of the automotive audio system of FIG. 35.

FIG. 36 shows one embodiment of the acoustical mixer 950 which comprises an anechoic chamber 952 and speakers 953 and 954. The speakers 953 and 954 are respectively connected to the first and second amplifiers 915*a* and 922 for reproducing audio sound within the anechoic chamber 952. An acoustical microphone 955 is inserted within the anechoic chamber to pick up audio signals. The microphone 955 is connected to a microphone amplifier which outputs audio signals to the fourth main amplifier 951.

Figure 37:
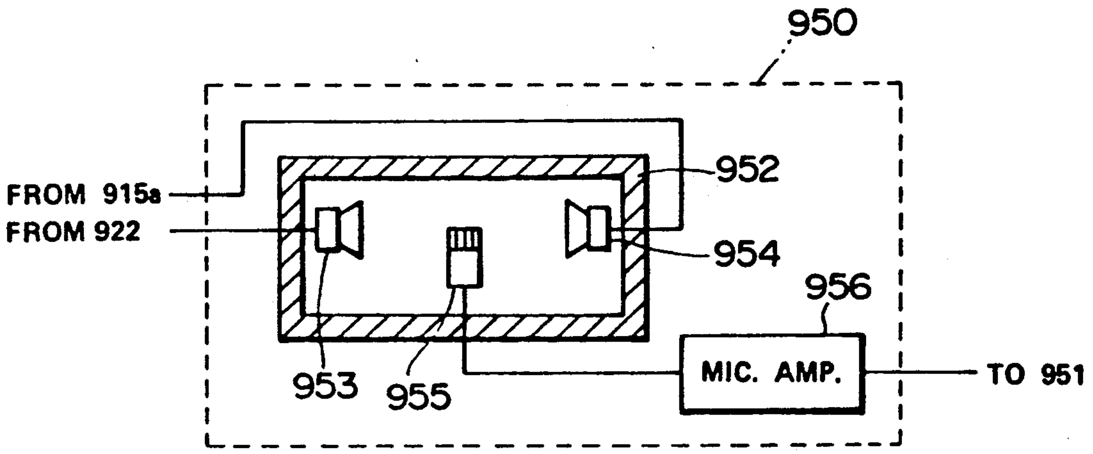
FIG. 37 is a fragmentary illustration showing a modification to the audio mixer of FIG. 36.

In the embodiment shown in FIG. 36, the speakers 953 and 954 are arranged with their acoustical axes parallel to each other. However, various arrangement of the speaker would be possibl. For example, the speakers 953 and 954 can be arranged in direct opposition as shown in FIG. 37.

As will be appreciated herefrom, all of the embodiments set out above afford the listener better ambience and higher-quality audio reproduction. Therefore, the present invention fullfills all of the objects and advantages sought therefor.

While the specific embodiments have been disclosed in order to clearly disclose the invention, it should be appreciated that the invention can be embodied in various ways which differ from the shown embodiments or their modifications. Therefore, it should be appreciated that the present invention includes all possible embodiments and modifications to the shown embodiments which do not depart from the principles of the invention, which are set out in the appended claims.

What is claimed is:

1. An automotive audio system for providing acoustic sound within a cabin of an automotive vehicle, said automotive audio system comprising:

an audio signal source adapted to generate audio signals for reproduction in said automotive vehicle;

a first speaker adapted to generate a first audio sound by reproducing said audio signals from said audio signal source, said first speaker being located in front of a predetermined listening point and directed to said predetermined listening point in a first direction;

first means for receiving and processing said audio signals from said audio signal source so as to delay said audio signals and for outputting a processed signal, said first means including a primary first delay means for providing first and primary delay of an audio signal and an auxiliary reverberation means for providing reverberation of a delayed audio signal based on a primary delay time;

a second speaker independent of said first speaker and adapted to generate a second audio sound by reproducing said processed signal, said second speaker being located in front of said predetermined listening point and directed toward said predetermined listening point in a second direction, different from said first direction, said second speaker having an acoustic axis oriented to intersect an acoustic axis of said first speaker at an oblique angle; and second means for receiving said audio signals from said audio signal source so as to discriminate a type of audio sound to be reproduced in order to control operation of said first means such that said first means is substantially disabled in response to a first type of audio sound to be reproduced and is enabled in response to a second type of audio sound to be reproduced.

2. An audio system for an automotive vehicle having a cabin and a seat for a vehicle occupant, said audio system comprising:

an audio signal generator means for generating audio electrical signals;

a first main amplifier means, coupled to said audio signal generator means, for receiving said audio electrical signals and for generating first amplified audio electrical signals;

a main speaker means, coupled to said first main amplifier means, for reproducing said first amplified audio electrical signals as first acoustic sound and for emitting said first acoustic sound in a first direction toward said vehicle occupant;

a second main amplifier means for receiving said audio electrical signals and for generating second amplified audio electrical signals;

an auxiliary speaker means, coupled to said second main amplifier means, for reproducing said second amplified audio electrical signals as second acoustic sound and for emitting said second acoustic sound in a second direction toward said vehicle occupant; and processing means, operatively disposed between said audio signal generator means and said second main amplifier means, for processing said audio electrical signals, said processing means including a first delay means for delaying transmission of said audio electrical signals from said audio signal generator means to said second main amplifier means, wherein said processing means includes an echo signal generator operatively disposed between said first delay means and said second main amplifier means, said echo signal generator having a feedback circuit including a level adjustor and a second delay means for delaying transmission of said audio signals through said feedback circuit.

3. An audio system as claimed in claim 2, wherein said first delay means provides a delay time in a range from 0.4 milliseconds to 50 milliseconds, and said second delay means provides a delay time shorter than 1 millisecond.

4. An audio system as claimed in claim 3, wherein said second direction at which said auxiliary speaker means emits said second acoustic sound is oblique to said first direction at which said main speaker means emits said first acoustic sound by an angle in a range from 60 degrees to 90 degrees.

5. An audio system as claimed in claim 3, wherein said second direction at which said auxiliary speaker means emits said second acoustic sound is oblique to said first direction at which said main speaker means emits said first acoustic sound by an angle in a range from 0 degrees to 30 degrees.

* * * * *